United States Patent
Di Cairano et al.

(10) Patent No.: US 12,061,474 B2
(45) Date of Patent: Aug. 13, 2024

(54) CONTROLLER FOR OPTIMIZING MOTION TRAJECTORY TO CONTROL MOTION OF ONE OR MORE DEVICES

(71) Applicants: Mitsubishi Electric Research Laboratories, Inc., Cambridge, MA (US); Mitsubishi Electric Corporation, Chiyoda-ku (JP)

(72) Inventors: Stefano Di Cairano, Newton, MA (US); Ankush Chakrabarty, Bedford, MA (US); Rien Quirynen, Somerville, MA (US); Mohit Srinivasan, Atlanta, GA (US); Nobuyuki Yoshikawa, Tokyo (JP); Toshisada Mariyama, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 426 days.

(21) Appl. No.: 17/407,437

(22) Filed: Aug. 20, 2021

(65) Prior Publication Data

US 2023/0074148 A1    Mar. 9, 2023

(51) Int. Cl.
*G05D 1/00*    (2024.01)
*G06F 18/214*    (2023.01)
*G06N 3/08*    (2023.01)

(52) U.S. Cl.
CPC ......... *G05D 1/0055* (2013.01); *G05D 1/0088* (2013.01); *G05D 1/02* (2013.01); *G06F 18/214* (2023.01); *G06N 3/08* (2013.01)

(58) Field of Classification Search
CPC ...... G05D 1/0055; G05D 1/0088; G05D 1/02; G05D 1/106; G05D 1/104; G06F 18/214;
(Continued)

(56) References Cited

U.S. PATENT DOCUMENTS

2021/0276594 A1* 9/2021 Oh .................... H04W 4/44
2022/0108621 A1* 4/2022 Li ...................... B64C 39/024
(Continued)

OTHER PUBLICATIONS

1. Kamal—Real Time Trajectory Planning for UAVs Using MILP—IEEE, 2005 (Year: 2005).*
(Continued)

*Primary Examiner* — Anne Marie Antonucci
*Assistant Examiner* — Patrick Daniel Mohl
(74) *Attorney, Agent, or Firm* — Gene Vinokur; Hironori Tsukamoto

(57) ABSTRACT

A controller for controlling a motion of at least one device subject to constraints on the motion, is disclosed. The controller comprises a processor and a memory, where the controller inputs parameters of the task including the state of the at least one device to a neural network trained to output an estimated motion trajectory for performing the task. Further, the controller extracts at least some of the integer values of a solution to a mixed-integer optimization problem for planning an execution of the task that results in the estimated motion trajectory. Further, the controller solves the mixed-integer optimization problem for the parameters of the task with corresponding integer values fixed to the extracted integer values to produce an optimized motion trajectory subject to the constraint and changes the state of the at least one device to track the optimized motion trajectory.

20 Claims, 21 Drawing Sheets

(58) Field of Classification Search
CPC ........ G06N 3/08; G06N 3/084; G06N 3/0464; G06N 3/047; G06N 3/048; G06N 3/091; G06N 3/092; G06N 5/01
See application file for complete search history.

(56) References Cited

U.S. PATENT DOCUMENTS

| | | | |
|---|---|---|---|
| 2023/0089978 A1* | 3/2023 | Pulver | G05D 1/0221 |
| 2023/0230475 A1* | 7/2023 | Gun | G05D 1/0217 701/117 |

OTHER PUBLICATIONS

3. Omer—Hybridization of Nonlinear and Mixed-Integer Linear Programming for Aircraft Separation With Trajectory Recovery—American Control Conference, 2002 (Year: 2002).*
4. Richards—Aircraft Trajectory Planning With Collision Avoidance Using Mixed Integer Linear Programming—IEEE, 2013 (Year: 2013).*
5. Richards—Spacecraft Trajectory Planning with Avoidance Constraints Using Mixed-Integer Linear Programming—Journal of Guidance, Control, and Dynamics, 2002 (Year: 2002).*
6. Schouwenaars—Mixed Integer Programming for Multi-Vehicle Path Planning—European Control Conference, 2001 (Year: 2001).*

* cited by examiner

CONTROLLER FOR OPTIMIZING MOTION TRAJECTORY TO CONTROL MOTION OF ONE OR MORE DEVICES

TECHNICAL FIELD

The present disclosure relates to a control system for planning motion of multiple moving devices, and more particularly to a controller for optimizing motion trajectory to control motion of one or more devices.

BACKGROUND

Optimal planning of the motion of multiple moving devices, in a workspace with obstacles, to achieve specific positions while avoiding collisions with the obstacles and between themselves has multiple applications, such as wheeled ground robots, aircraft on ground, and flying drones. For instance, aerial drones can be coordinated to reach certain positions to inspect a structure while avoiding collisions with other structures and between themselves. An aircraft can be coordinated to move on airport grounds to reach its assigned runaway or gate while avoiding other aircrafts, carts, and structures. Mobile robots on a factory floor can be coordinated to reach their work positions or the positions where they need to unload cargo while avoiding work areas, human workers, and the other robots. However, such a planning is challenging because the presence of obstacles makes an admissible workspace, and the configurations that the moving devices can take without collisions, non-convex, and non-convex problems require a large amount of time and computational resources for solution.

Generally, mixed-integer programming (MIP) is an approach that can solve the aforementioned planning problem. The MIP approach involves solving a constrained optimization problem, where a cost function is minimized/ maximized subject to some constraints, some optimization variables are real-valued (continuous variables), and others are integer or binary-valued (discrete-variables). In particular, mixed-integer linear/quadratic programming (MILP/ MIQP) can be applied when a motion of the devices can be described by linear dynamics and the obstacles can be represented, possibly in a conservative way, by polygons (i.e., by linear inequalities). The MILP/MIQP is known to terminate in finite time, and hence bounds on the time to compute the solution can be derived. However, the computation is still very complex (NP-Hard) and requires a significant amount of computational resources, memory, and executed operations. Instead, a central control system coordinating the devices often needs to be implemented in an embedded processing unit (EPU) that has limited memory and limited computing capabilities. Consequently, there is a need for a solution that can achieve optimal planning of the motion of multiple devices in a workspace with obstacles while using limited computational and memory resources typical of EPUs, which means reducing the computations and memory requirements for solving MIPs.

Some existing solutions to reduce computational requirements for solving MIPs include use of machine learning (ML) for learning to approximate the solution of the MIPs. In such a case, several MIPs are solved to generate training data, which are then used to train an ML method, for instance, a neural network (NN). During execution, rather than solving the MIP problem, the trained NN is evaluated for obtaining the approximate solution. However, this motion planning method may cause collisions for one or multiple devices due to machine learning approximating the actions for obstacle avoidance. Obstacle avoidance requires a discontinuous trajectory with respect to a device's initial position because from some device positions an obstacle will be avoided by turning around it from the left, and from different device positions it will be avoided by turning around it from the right. In between such two device positions, there would be an area from which a small perturbation to the left causes the device to take a left-around path, while a small perturbation to the right causes the device to take a right-around path. On the other hand, common ML architectures produce continuous signals. This means that small deviations from an input vector, for instance, device and obstacle positions, result in small variations of the output vector and the device trajectories. Accordingly, common ML architectures cannot achieve trajectories that always avoid obstacles because common ML architectures perform an interpolation of trajectories used for training. Interpolating trajectories going around the obstacle from the left and others going around an obstacle from the right always results in trajectories that for some initial position of the device go straight through the obstacle, therefore causing a collision. Hence, embodiments of the disclosure are based on the realization that using ML by itself will be causing collisions for some initial conditions.

Some other existing solutions involve use of the trajectory obtained from ML as an initial guess for the solution of the MIP problem, through a so-called warm starting of the MIP solution algorithm. For example, the solution of the MIP problem is based on a branch and bound optimization algorithm, such that the initial solution guess can be used to obtain an upper bound on the optimal value which allows to avoid a full exploration of the branch and bound tree. Thus, a number of real-valued problem relaxations in the branch and bound algorithm is reduced, and hence the computations and the required memory for solving the MIP are also reduced. However, the warm starting is effective for bounding the optimal MIP solution only if the ML solution is feasible, and that is not the case for solutions that collide with the obstacles, where the solutions that collide with the obstacles can be generated by applying ML to a problem that is discontinuous. Further, the warm starting still requires solving the original MIP. Thus, even though some speedup in obtaining the solution is likely, in some cases there will be no speedup, or the solver may take even longer time, for instance, if the warm starting suggests exploring a branch of the tree that is different from the one where the solution is, and if a common heuristic would rule out such branch at the root.

Therefore, embodiments of the disclosure are based on the realization that even with warm starting, the solution of the MIP problem often still requires a significant amount of computational resources, memory, and executed operations.

Thus, there is still a need for solving the motion planning problem with low computational and memory requirements reliable for different configurations of devices, obstacles, and goals.

SUMMARY

Accordingly, it is an objective of some embodiments to solve the optimization problem of the motion trajectory of one or more devices. In particular, it is an objective of some embodiments to solve the MIP problem to optimize the motion trajectory of one or more devices that are subject to constraints.

Some embodiments are based on the realization that a machine learning (ML) algorithm may be used to obtain a fast and reliable solution to the MIP problem for the planning of the motion of one or more devices in such a way that obstacles are avoided and desired goal positions are achieved.

Some embodiments are based on the realization that an ML module, for instance, a neural network, may be trained from a set of selected training data, to obtain a prediction of trajectories for each of the devices, where the devices ae subject to constraints. Rather than using the trajectories integrally (e.g., in approaches that rely solely on ML, or using the prediction as an initial guess of the MIP problem, or warm starting approaches), some embodiments are based on the realization that predicted values of specific variables (in particular, all of the integer variables or at least some part of the integer variables) can be extracted. Further, the specific variables may be fixed to such predicted values in the MIP problem. As a result, a reduced problem may be obtained, where some variables are already determined. Further, the reduced problem may be solved by a simpler optimization method to obtain a complete solution for the multi-device motion planning problem, which can be used directly or refined in a full MIP problem solution. In such a manner, some embodiments transform the mixed-integer optimization problem into a real-valued optimization problem by fixing the integer variables of the MIP problem to the extracted integer values.

In some embodiments, the MIP problem is formulated to search for a global optimal solution within a search space determined by the constraints. Further, an admissibility of a value of at least some integer variables partitioning the search space of the mixed-integer optimization is evaluated based on the predicted trajectory for performing a task. In some embodiments, at least some of the integer variables are binary. In some cases, at least some of the integer variables are associated with groups of disjunctive constraints of real valued variables for avoidance of collisions between a device and obstacles, and among multiple devices. In case one of the constraints of real-valued variables in the groups of disjunctive constraints is satisfied at a specific time instant, the collision with the corresponding obstacle or a device is avoided at the specific instant.

In some embodiments, the admissibility of values of at least some integer variables of the MIP problem is tested by determining a membership of at least some parts of the predicted trajectory to regions determined by the constraints of real-valued variables defining the obstacles or the other device of the multiple devices.

Some embodiments are based on the realization that the integer values can be extracted when the ML module estimates a feasible trajectory for each of the controlled devices. Thus, there is a need to improve the likelihood of the predicted trajectory being feasible by acting on the data for training, the training loss function, and the fixing of the variables.

In some embodiments, the mixed integer-optimization problem is warm started based on the optimized motion trajectory in order to update the optimized trajectory. The optimized motion trajectory is updated in response to detection of time availability before an instant at which the optimized trajectory computation needs to be completed.

Some embodiments are based on the realization that for the ML module to be more precise where collisions are more likely, focused sampling may be used training data selection in place of uniform sampling to obtain more information near the obstacles. Some embodiments are based on the realization that for training the ML module, a loss function may include additional terms that favor training errors to be moving away from constraints, as opposed to being neutral with respect to the constraints. When the predicted trajectory is infeasible (i.e., when the collision does not occur), a feasible trajectory can be reconstructed by moving according to a part of the predicted trajectory that is planned before the collision. Further, the ML module may be re-evaluated from the new position for each of the devices, possibly continuing the process until the resulting trajectory is feasible for each of the devices, and finally concatenating the sequence of parts of predicted trajectories.

Accordingly, one embodiment discloses controller, for controlling a motion of at least one device, performing a task of changing a state of the at least one device, wherein the state of the at least one device includes at least a position of the at least one device, subject to constraints on the motion of the at least one device, the controller comprising: a processor; and a memory having instructions stored thereon that, when executed by the processor, cause the controller to: input parameters of the task including the state of the at least one device to a neural network trained to output an estimated motion trajectory for performing the task; extract at least some of integer values of a solution to a mixed-integer optimization problem for planning an execution of the task that results in the estimated motion trajectory; solve the mixed-integer optimization problem for the parameters of the task with corresponding integer values fixed to the extracted integer values to produce an optimized motion trajectory subject to the constraint; and change the state of the at least one device to track to the optimized motion trajectory.

DETAILED DESCRIPTION

The embodiments of the present disclosure disclose a system for generating a motion plan of one or multiple autonomous devices so that each device achieves its corresponding goal, represented by a target position. Furthermore, the motion plan must avoid collision of each device with obstacles in the environment, and between any two different devices at all times in a future planning time horizon. Example of devices include autonomous ground vehicles, such as cars or robots in factory automation, aircraft on airport surfaces, and unmanned aerial vehicles such as drones for infrastructure monitoring or inspections.

Figure 1A:
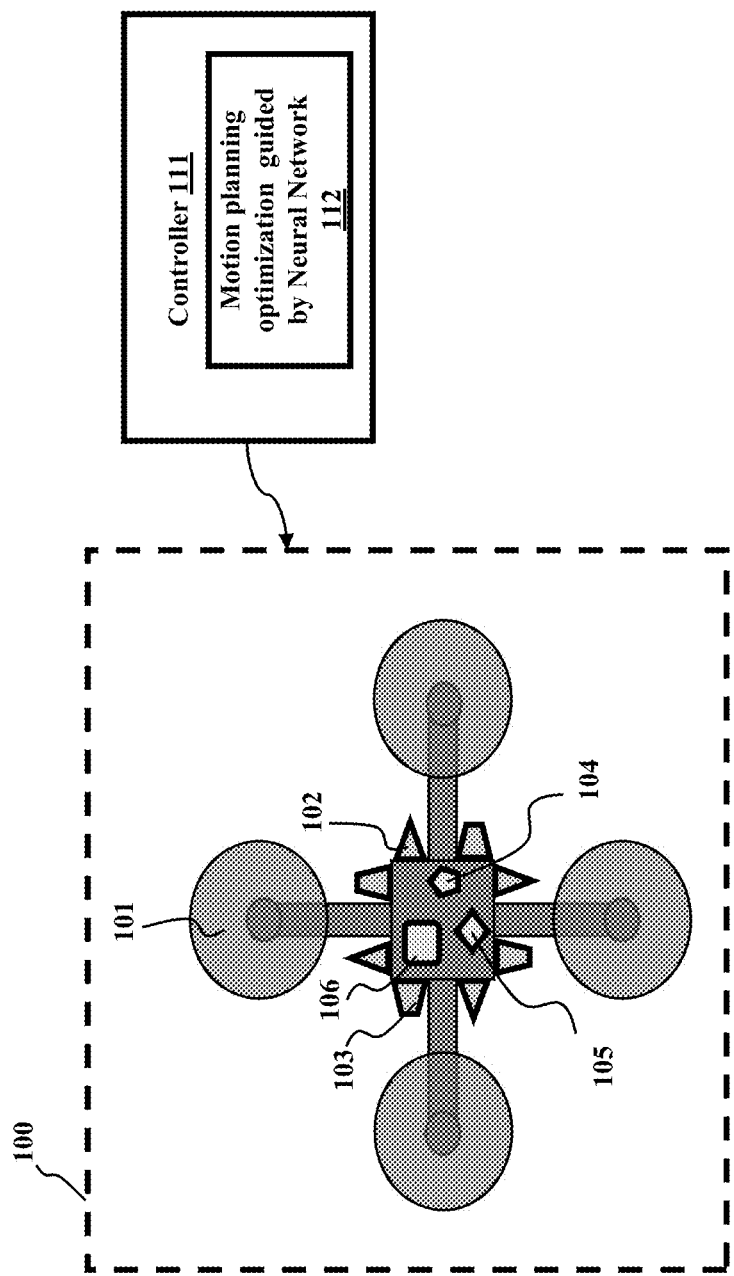
FIG. 1A illustrates a controller for controlling a device, according to some embodiments of the present disclosure.

FIG. 1A illustrates a schematic of a controller 111 for controlling a device 100, according to the embodiments of the present disclosure. Examples of the device 100 may include, but are not limited to, autonomous vehicles, mobile robots, aerial drones, ground vehicles, aerial vehicles, surface water vehicles, and underwater vehicles, and the like. In FIG. 1, a schematic of a quadcopter drone, as an example of the device 100 in the embodiments of the present disclosure is shown. The device 100 includes actuators that cause motion of the device 100, and sensors for perceiving environment and location of the device 100. Hereinafter, the device 100 is also referred to as drone 100. As shown in FIG. 1, the rotor 101 may be the actuator, the sensor perceiving the environment may include light detection and ranging 102 (LIDAR) and cameras 103. Further, sensors for localization may include GPS or indoor GPS 104. Such sensors may be integrated with an inertial measurement unit (IMU). The drone 100 also includes a communication transceiver 105, for transmitting and receiving information, and a control unit 106 for processing data obtained from the sensors and transceiver 105, for computing commands to the actuators 101, and for computing data transmitted via the transceiver 105.

Further, based on the information transmitted by the drone 100, a controller 111 is configured to control motion of the drone 100 by computing a motion plan for the drone 100. The motion plan for the drone 100 may comprise one or more trajectories to be traveled by the drone. In some embodiments, there are one or multiple devices (drones such as the drone 100 as shown in FIG. 1) whose motions are coordinated and controlled by the controller 111. Controlling and coordinating the motion of the one or multiple devices corresponds to solving a mixed-integer optimization problem.

The controller 111 controls the motion of the drone 100 performing a task by changing a state of the one drone 100, where the state of the drone 100 may include a position of the drone 100 subject to constraints on the motion of the drone 100. The controller 111 controls the motion of the drone 100 by using a neural network 112 limiting the search space for searching for the motion trajectory according to some embodiments. The neural network 112 may be a probabilistic or deterministic neural network.

In different embodiments, the controller 111 obtains parameters of the task from the drone 100 and/or remote server(not shown). The parameters of the task include the state of the drone 100, but may include more information. In some embodiments, the parameters may include one or a combination of an initial position of the drone 100, a target position of the drone 100, a geometrical configuration of one or multiple stationary obstacles defining at least a part of the constraint, geometrical configuration, and motion of moving obstacles defining at least a part of the constraint. The parameters are submitted to the neural network 112 to obtain an estimated motion trajectory for performing the task, where the neural network 112 is trained to output the estimated motion trajectory for performing the task.

Further, based on the input parameters, the neural network 112 may extract at least some of the integer values of a solution to the mixed-integer optimization problem for planning an execution of the task that results in the estimated motion trajectory. The mixed-integer optimization problem is solved for the parameters of the task with corresponding integer values fixed to the extracted integer values to produce an optimized motion trajectory subject to the constraints. Accordingly, the task of changing the state of the drone 100 is performed to track the optimized motion trajectory. In such a manner, the neural network 112 limits the search space for finding motion trajectories, but the optimal motion trajectory is determined by the controller 111. As a result, such a combination allows finding a feasible and/or optimal motion trajectory for the drone 100 with reduced computation and memory resources.

Figure 1B:
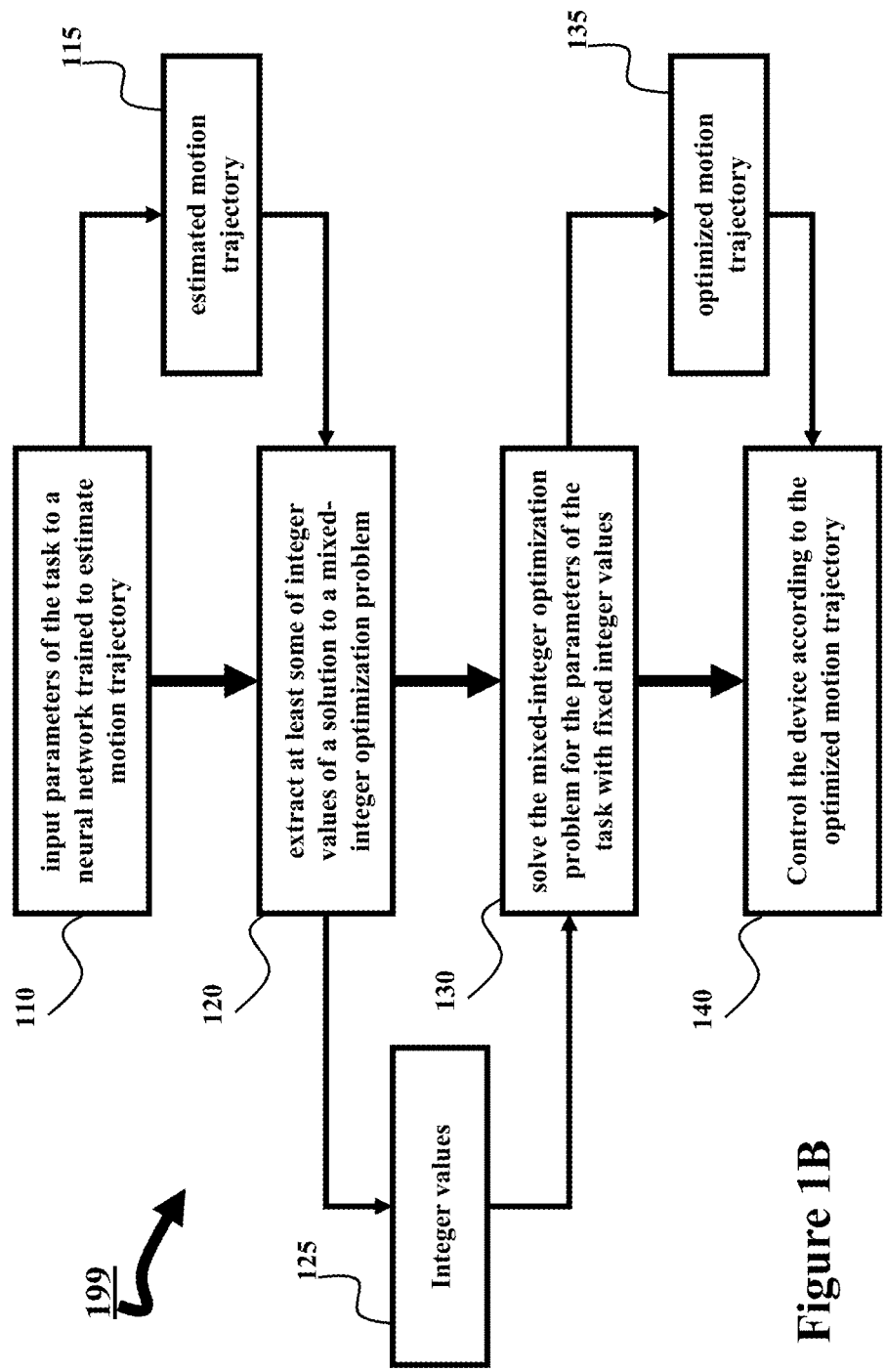
FIG. 1B shows a block diagram of a method for controlling a motion of a device according to some embodiments of the present disclosure.

FIG. 1B shows a block diagram of a method 199 executed by controller 111 for controlling a motion of at least one device, such as the device 100, according to some embodiments. The device 100 is performing a task changing its state that includes at least its position. The performance of the task is subject to a constraint on the motion of the device 100. The controller 111 includes a processor and a memory having instructions stored thereon that, when executed by the processor, cause the controller to implement the method 199.

Method 199, upon receiving parameters of the task including the state of the device, inputs 110 the parameters to a neural network 112 trained to output an estimated motion trajectory 115 for performing the task. Method 199 extracts 120 at least some of integer values 125 of a solution to a mixed-integer optimization problem for planning an execution of the task that results in the estimated motion trajectory and solves 130 the mixed-integer optimization problem for the parameters of the task with corresponding integer values fixed to the extracted integer values 125 to produce an optimized motion trajectory 135 subject to the constraint.

Next, controller 111 commands the device 100 to change 140 its state according to the optimized motion trajectory 135 thereby performing the task. For example, the controller can determine a control input to an actuator of the device 100 to track the motion trajectory. Examples of the controller generating the control input can be the proportional-integral-derivative controller, model predictive controller, reinforcement learning controller, and the like.

Notably, some embodiments train the neural network to estimate the trajectory 115, not the integer values 125. Some embodiments are based on the realization that doing in such a manner would simplify the training that produces a feasible result.

Multi-Device Motion Planning

Figure 2:
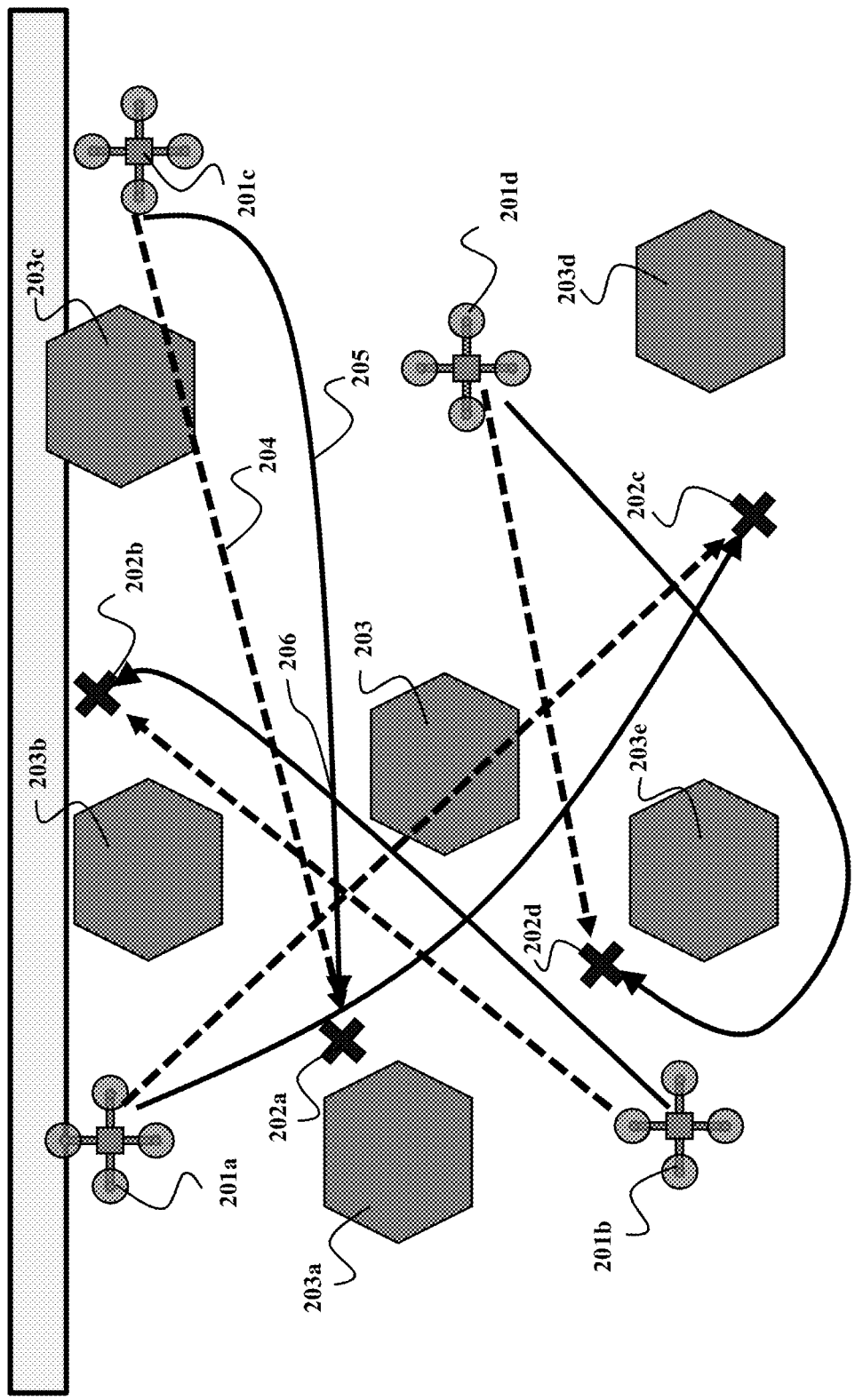
FIG. 2 illustrates a multi-device motion planning problem, according to some embodiments of the present disclosure.

FIG. 2 illustrates multi-device motion planning problem, according to some embodiments of the present disclosure. In FIG. 2, there is shown multiple devices (such as a drone 201a, a drone 201b, a drone 201c, and a drone 201d) that are required to reach their assigned final positions 202a, 202b, 202c, and 202d. There is further shown an obstacle 203a, an obstacle 203b, an obstacle 203c, an obstacle 203d, an obstacle 203e, and an obstacle 302f in surrounding environment of the drones 201a-201d. The drones 201a-201d are required to reach their assigned final positions 202a-202d while avoiding the obstacles 203a-203f in the surrounding environment. Simple trajectories (such as a trajectory 204 as shown in FIG. 2) may cause collisions. Accordingly, embodiments of the present disclosure computes trajectories 205 that avoid obstacles 203a-203f and avoid collision between drones 201a-201d, which can be accomplished by avoiding overlaps of the trajectories, or by ensuring that if multiple trajectories overlap 206, the corresponding drones reach the overlapping points at time instants in a future planning time horizon that are sufficiently separated.

Figure 3:
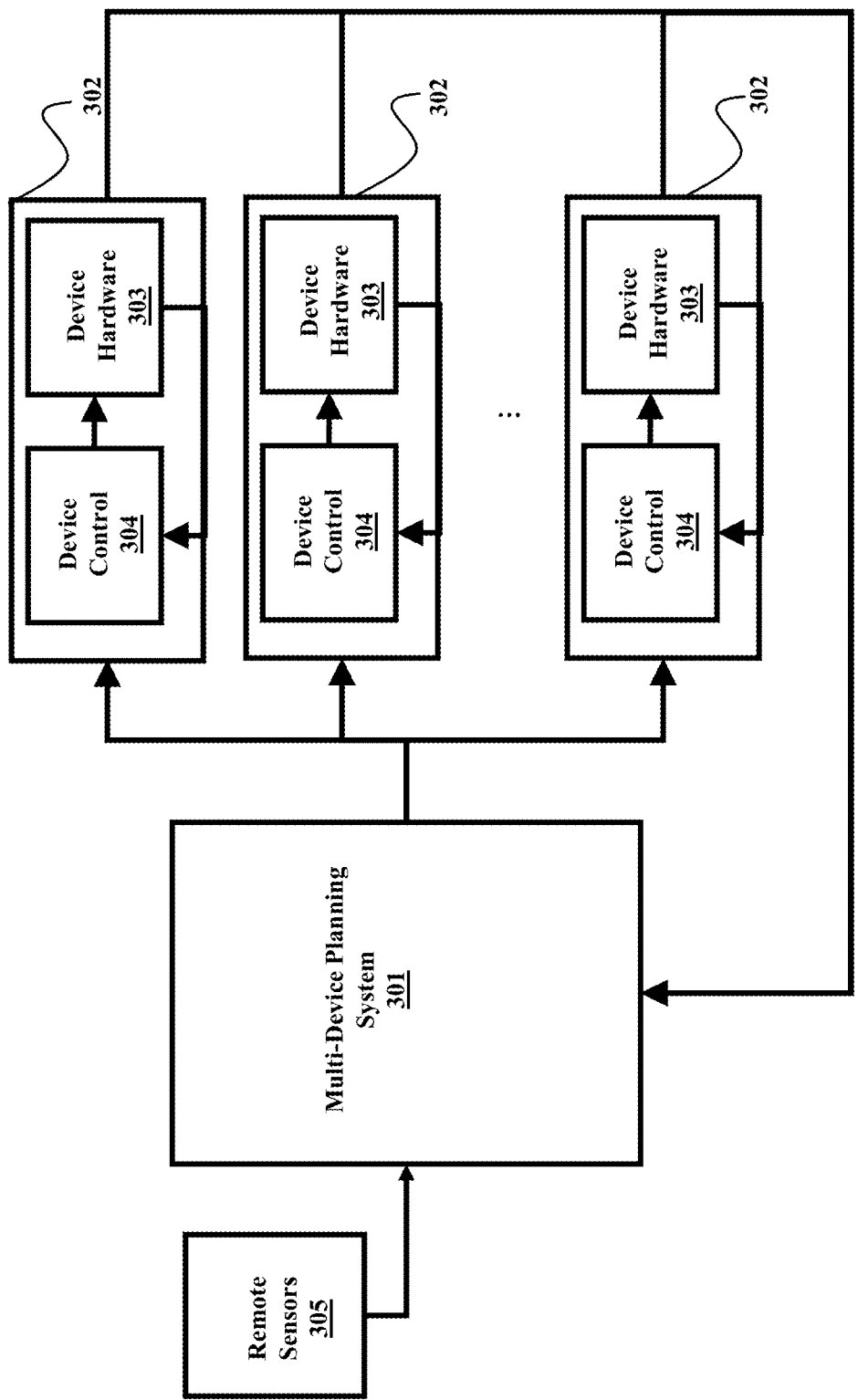
FIG. 3 shows a schematic of components involved in multi-device motion planning, according to some embodiments of the present disclosure.

FIG. 3 shows a schematic of components involved in multi-device motion planning, according to the embodiments of the present disclosure. FIG. 3 is a schematic of the system for coordinating the motion of multiple devices 302. The multi-device planning system 301 may correspond to the controller 111 as shown in FIG. 1. The multi-device planning system 301 receives information from at least one of the multiple devices 302 and from one or multiple remote sensors 305 via its corresponding communication transceiver. Based on the obtained information, the multi-device planning system 301 computes motion plan for each device 302. The multi-device planning system 301 transmits the motion plan for each device 302 via the communication transceiver. The control system 304 of each device 302 receives the information and uses it to control corresponding device hardware 303.

Figure 4:
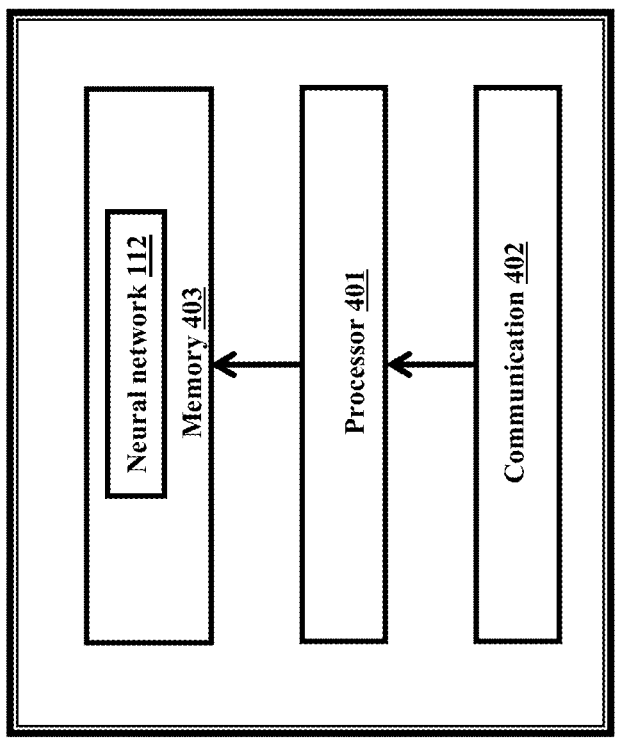
FIG. 4 shows a schematic of a multi-device planning system for controlling one or more devices subject to constraints, according to some embodiments of the present disclosure.

FIG. 4 shows a schematic of a multi-device planning system 301 for controlling one or more devices, according to the embodiments of the present disclosure. The multi-device planning system 301 includes a hardware processor 401 connected to a communication transceiver 402, and to a memory 403. In some embodiments, the hardware processor 401 is an embedded processing unit (EPU). The memory 403 may include a non-transitory computer-readable medium.

In some implementations, the memory 403 may include a plurality of sections, where a first section stores data about each of the devices 302, a second section stores one or more computer readable programs for computing motion plan of each device 302, a third section stores parameters of a machine learning (ML) module for predicting a solution of the motion planning problem, and a fourth section stores data about environment of surroundings of one or more devices 302. In some embodiments, the memory 403 may store algorithms associated with the neural network 112. The hardware processor 401 and the memory 403 form a controller (e.g., the controller 111) that controls motion of one or more devices performing a task of changing a state of the one or more devices. The state of the at least one device includes a position of the one or more devices, subject to the constraints on the motion of the one or more devices.

Exemplar Formulation

A motion planning problem, such as the multi-device planning system 301 for the optimal solution for coordinating the motion of the one or more devices 302 may exploit mixed-integer programming. In some embodiments, the motion model of each device $i=1, \ldots, n_a$, may be formulated as the discrete-time dynamic system $$x_{k+1}^i = A^i x_k^i + B^i u_k^i,$$
$$z_k^i = C^i x_k^i + D^i u_k^i, \qquad (1)$$

where k is the discrete-time step counter, $x^i$ is the i-th device state vector, $u^i$ is the i-th device command vector, $z^i$ is the i-th device configuration vector which includes at least the position of the device, and $A^i$, $B^i$, $C^i$, $D^i$ are matrices describing the behavior of the i-th device in response to a value of the command vector, applied at a particular system state.

The initial state, physical, and functional limitations of the devices are formulated as real-valued constraints (illustrated in FIG. 5):

$$x_0^i = x^i(t) \qquad (2a)$$
$$u_k^i \in \mathcal{U}^i \qquad (2b)$$
$$x_k^i \in \mathcal{X}^i \qquad (2c)$$

where $x^i(t)$ is the state of the i-th device at the current time t, $\mathcal{U}^i$ is the set of admissible inputs of the i-th device, and $\mathcal{X}^i$ is the set of admissible states of the i-th device. The sets $\mathcal{X}^i, \mathcal{U}^i$ maybe polyhedra, which are determined by affine constraints, each of the constraints representing a halfspace.

The collision avoidance of each device $i=1, \ldots, n_a$ with each obstacle $j=1, \ldots, n_o$ can be formulated as mixed-integer constraints $$H_o^j(z_k^i - \vartheta^j) \geq K_o^j - M(1 - b_k^{i,j}), \sum_{h=1}^{n_j^o}[b_k^{i,j}]_h \geq 1, \qquad (3)$$

where M is the big-M constant which is larger than any admissible value for the inequalities, $b_k^{i,j}$ is a vector of binary variables, $[b_k^{i,j}]_h$ denotes the h-th component of such vector, and $H_o^j$, $K_o^j$ are a matrix and a vector that describe the region $$H_o^j(z-\vartheta^j) \le K_o^j \qquad (4)$$

occupied by the j-th obstacle with respect to the obstacle center $\vartheta^j$, $n_j^o$ is the number of elements in $K_o^j$, i.e., the number of inequality constraints in (4).

Figure 5:
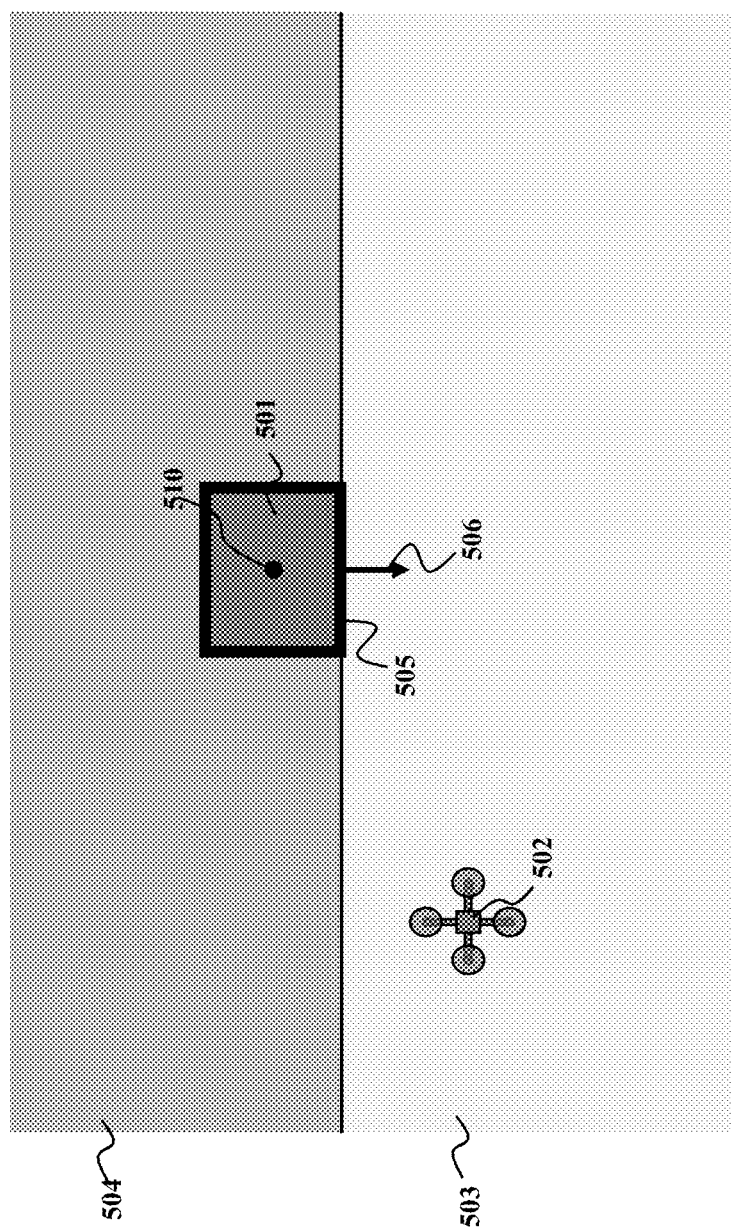
FIG. 5 illustrates collision avoidance constraints of motion of the one or more devices, according to some embodiments of the present disclosure.

FIG. 5 illustrates a schematic of collision avoidance constraints of motion of the one or more devices 502, according to some embodiments of the present disclosure. In FIG. 5, there is shown an effect of the mixed-integer constraints (3) for collision avoidance between each device 502 and each obstacle 501. A region of the obstacle 501 with center 510 is represented by a polyhedron and it is avoided by the device 502 if a device position is in a complement 503 of at least one of the halfspaces 504 constructed from an obstacle border 505 and a normal vector 506, and which determines the region of the obstacle 501. Some embodiments are based on the realization that the obstacle 501 can be avoided if at least one of the binary variables in $b_k^{i,j}$ is 1, as imposed by the mixed-integer inequality constraints in (3).

Similarly, collision avoidance constraints of device $i=1, \ldots, n_a$, with each other device $l=1, \ldots, n_a$ different from $i \ne l$, can be formulated as mixed-integer constraints similar to constraints (3) as follows $$H_r^l(z_k^i - z_k^l) \ge K_r^l - M(1 - d_k^{i,l}), \sum_{h=1}^{n_l^r}[d_k^{i,l}]_h \ge 1, \qquad (5)$$

where $d_k^{i,j}$ is a vector of binary variables, and $H_r^l$, $K_r^l$ are a matrix and a vector that describe the region $$H_r^l(z_k^i - z_k^l) \le K_r^l \qquad (5a)$$

where collision between i-th and l-th device occurs, and $n_l^r$ is the number of elements in $K_r^l$, i.e., the number of inequality constraints in (5a).

The collision avoidance constraints between the device 502 and the obstacle 501 and between the device 502 and another device are constructed from a group of real-valued constraints determining the region of the obstacle 501 or other device as the intersection of the corresponding regions 504 where the constraints are satisfied. Further, each constraint of the group of real-valued constraints is associated with at least one binary variable indicating whether the constraint is satisfied at a specific time instant.

To construct the collision avoidance constraints, the complements 503 of the region 504 are formulated as constraints and to each constraint, a binary variable is added to obtain mixed-integer disjunctive constraints. A disjunctive constraint composed of a group of real-valued constraints is satisfied if at least one of the constraints in the group of the constraints is satisfied. Thus, if one real-valued constraint in the group of constraints defining avoidance to the obstacle 501 is satisfied, then the other constraints may be satisfied or violated. Disjunctive constraints can be formulated by mixed-integer constraints by collecting the real-valued constraints, adding an integer variable to each in a way so that it takes value 1 if the constraint is satisfied, and imposing that at least one variable in the group takes value 1, as done in constraints (3), (5).

The goal-reaching condition $\|x_k^i - x_{goal}^i\|_1 \le d$ can also be implemented by mixed integer constraints:

$$\|x_k^i - x_{goal}^i\|_1 \le d + M(1 - g_k^i), \sum_{k=1}^{T} g_k^i = 1, \qquad (6)$$

where $g_k^i$ is a binary variable and $x_{goal}^i$ is the goal state for the i-th device, which ensures that the $g_k^i$ binary variables can be 1 only if the goal is reached at time step k and, for each device $i=1, \ldots, n_a$, only one binary variable $g_k^i$ can be equal to 1 for a particular time step k, where $0 \le k \le T$, ensuring the goal will be reached at some time step k smaller than the future planning time horizon length T.

The objective function or cost function determines the performance metrics that should be optimized by the selected trajectories for all the devices. In some embodiments, the cost function can be set as $$J = \sum_{i=1}^{n_a}\sum_{k=1}^{T}(kg_k^i + \gamma\|u_{k-1}^i\|_1), \qquad (7)$$

where the first term favors moving quickly to the goal, and the second term favors minimizing the energy for going towards the goal for each device $i=1, \ldots, n_a$ at each time step $k=1, \ldots, T$.

By collecting the cost function (7), the motion model (1), and the constraints (2), (3), (5), (6) a mixed-integer linear program (MILP) is obtained:

$$\min_{\xi} c^\top \xi \qquad (8)$$
$$\text{s.t. } H\xi \le K,$$
$$[\xi]_h \in \mathbb{R}, \quad \forall h \in V_r,$$
$$[\xi]_h \in \{0, 1\}, \quad \forall h \in V_b,$$

where c is the cost function vector, H, K are the constraint matrix and vector, x is the vector of variables whose components with indices $h \in V_r$ are real valued, while those with indices $h \in V_b$ are binary (i.e., 0-1) valued. The components with indices $h \in V_r$ include the state, input, and configuration vectors, $x_k^i$, $u_k^i$, $z_k^i$ for all devices $i=1, \ldots, n_a$ at each time step $k=1, \ldots, T$, and possibly a vector of additional auxiliary variables y, for example, including auxiliary variables for representing the l-norm in the cost function (7). The components with indices $h \in V_b$ include the binary variables for collision avoidance with obstacles, $b_k^{i,j}$, and for collision avoidance between devices, $d_k^{i,l}$, and the goal-reaching binary variables $g_k^i$, for all devices $i=1, \ldots, n_a$ at each time step $k=1, \ldots, T$.

Other embodiments of the present disclosure change cost function (7) or alternatively contain quadratic terms, resulting in a mixed-integer quadratic program (MIQP), with the same constraints as in (8), but with quadratic cost function $\xi^T Q \xi + c^T \xi$. For example, in some embodiments, the quadratic cost function may include a quadratic penalty on control inputs or distance from the target at each time instant.

Figure 6:
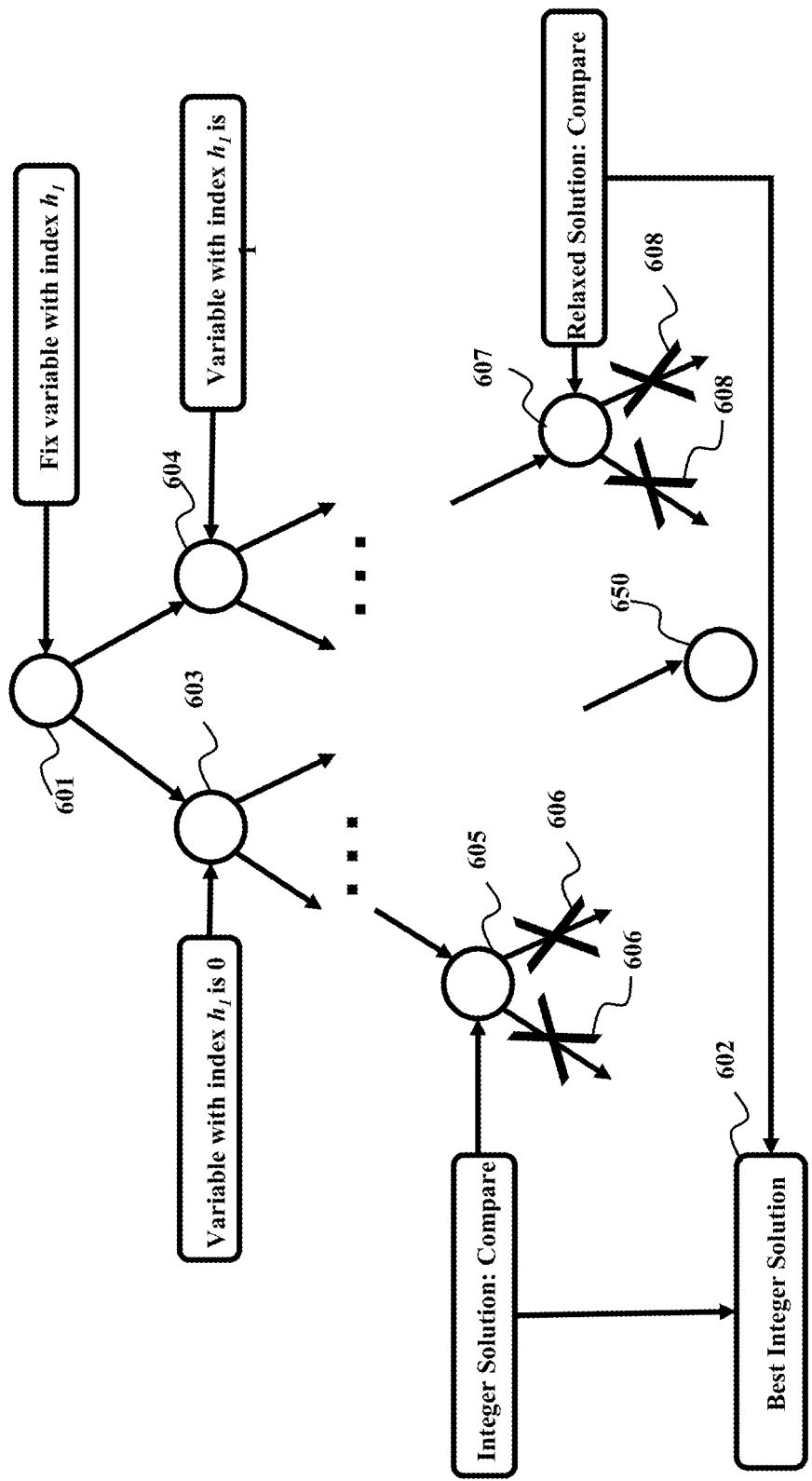
FIG. 6 illustrates a schematic of the solution of the mixed-integer programming (MIP) problem via the branch and bound method for planning the multi-device motion, according to some embodiments of the present disclosure.

The MIP problem (8) may be solved by a branch and bound method described in FIG. 6. The branch and bound method can solve the mixed-integer optimization problem to obtain an optimal solution to the MIP problem (8). However, the branch and bound method solves multiple optimization problems for different values of the integer variables which consumes the computational resource of the controller 111.

FIG. 6 illustrates solution of a Mixed-integer programming (MIP) problem via branch and bound tree method for planning the multi-device motion creating a problem address by some embodiments of the present disclosure for the case where integer variables are binary, that is each integer variable is not larger than 1, so that it can be either 0 or 1, only. At a root node 601 of the branch and bound tree, the solution of the MIP problem starts by relaxing all components of $\xi$ with indices in $V_b$ to be real-valued as opposed to binary-valued. The solution of the relaxed problem is obtained using standard methods for real-valued mathematical programming, such as interior point method, active set method, or simplex method. Then, if the solution satisfies integer constraints (i.e., if all the components of $\xi$ with indices in $V_b$ are binary), it can be stored as best integer solution 602. Otherwise, one component of $\xi$ with indices in $V_b$ is selected and assigned to value 0 in the child node of a first branch 603 of the branch and bound tree, and the same component is assigned to a value 1 in a child node of another branch 604 so that two new problems are created with fewer relaxed variables and all non-assigned variables allowed to be real-valued.

In case an integer feasible solution is found at some node (e.g., a node 605), it is compared with the stored integer solution. In case it is found to be a better solution, i.e., it has a smaller cost, the new solution can replace the stored solution, otherwise, it is discarded. In both cases, further exploration from that node stops 606. In case the solution of a relaxed problem is found to be worse at any node (e.g., a node 607), i.e., it has a higher cost, than the stored integer solution, further exploration from that solution stops 608.

Accordingly, the solution of the MIP problem (8) obtained for instance by the branch and bound algorithm shown in FIG. 6 produces the optimal trajectories for the multi-device motion planning problem. However, FIG. 6 shows that the number of relaxed problems solved is combinatorial with respect to the integer (or binary) variables, and hence the computational burden for solving the MIP problem (8) may be very large, both in terms of time and memory requirements. This is particularly true when the number of devices increases, because this causes a combinatorial increase in the number of relaxed problems to be solved, i.e., adding one device can more than double the number of problems to be solved. The latter observation makes such a branch and bound method unsuitable for embedded control units with limited computational and memory resources especially when the solution must be re-computed quickly because some of the obstacle locations, device states, or goals have changed.

Figure 7:
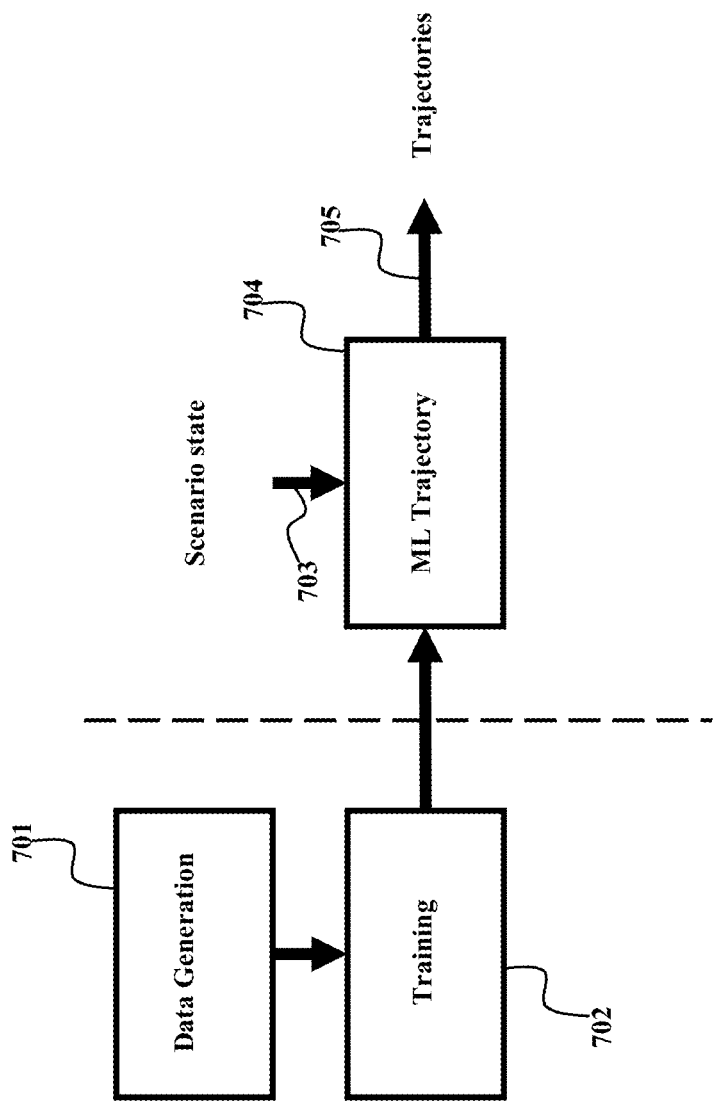
FIG. 7 illustrates a functional block diagram for solving a multi-device motion planning problem based on a machine learning (ML) module, according to some embodiments of the present disclosure.

In order to remove such issues, some embodiments are based on ML techniques as described further with reference to FIG. 7. FIG. 7 illustrates a functional block diagram for solving a multi-device motion planning problem based on a machine learning (ML) module 704, according to the embodiments of the present disclosure. As shown in FIG. 7, data generation 701 may be executed, for instance, by solving the multi-device motion planning problem in simulation for different scenario states including at least some of device initial positions, goals, and obstacle centers, and/or dimensions. Further, the data is used to train 702 the ML module 704 containing a prediction model based on, for instance, a neural network. Further, a scenario state is received 703, and accordingly the ML module 704 computes ML trajectories 705 for the devices that solve the multi-device motion planning problem.

Some embodiments are based on the realization that there are several cases in which the approach described with respect to FIG. 7 becomes challenging. This is because prediction models such as neural networks typically produce continuous functions, while the collision avoidance requires discontinuous functions. Continuous functions cause small deviations of the trajectories for small deviations of the data. However, for the collision avoidance, small deviations of the data may need to cause large deviations of the trajectory, because for instance the path to avoid the obstacle needs to change from circling around the obstacle from the left to circling around the obstacle from the right. In addition, embodiments of the disclosure are based on the realization that training 702 of ML modules (such as the ML module 704) that produce discontinuous functions is extremely difficult and may require a significant amount of data 701.

Figure 8:
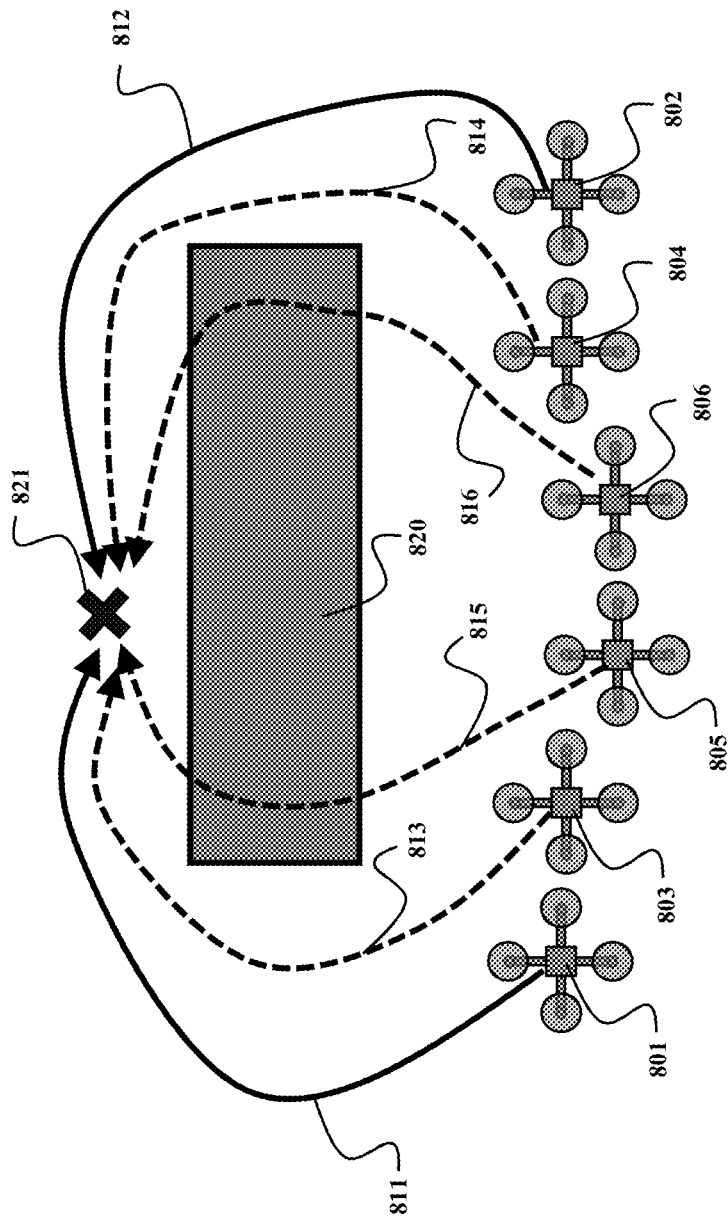
FIG. 8 illustrates collision among multiple devices due to approximation behavior of the ML module when using continuous prediction models to predict discontinuous trajectories in a collision-avoidance mode, according to some embodiments of the present disclosure.

FIG. 8 illustrates collision among multiple devices due to approximation behavior of the ML module when using continuous prediction models to predict discontinuous trajectories in a collision avoidance mode, according to the embodiments of the present disclosure.

FIG. 8 shows that for a device in a first position 801, a trajectory 811 to avoid collision with an obstacle 820 and to reach a goal 821 that circles around the obstacle 820 from the left, while for a second initial condition 802, the trajectory 812 circles around the obstacle 820 from the right. As shown in FIG. 8, for some intermediate conditions 803 and 804, a continuous function with small deviations from the trajectories obtained for initial conditions 801 and 802 may still avoid the obstacle 820 if the circling behavior is maintained in trajectories 813 and 814. However, for farther away initial conditions 805 and 806, small modifications to the trajectories 811 and 812 obtained for initial conditions 801 and 802 may cause trajectories 815 and 816 to collide with the obstacle 820.

Figure 9:
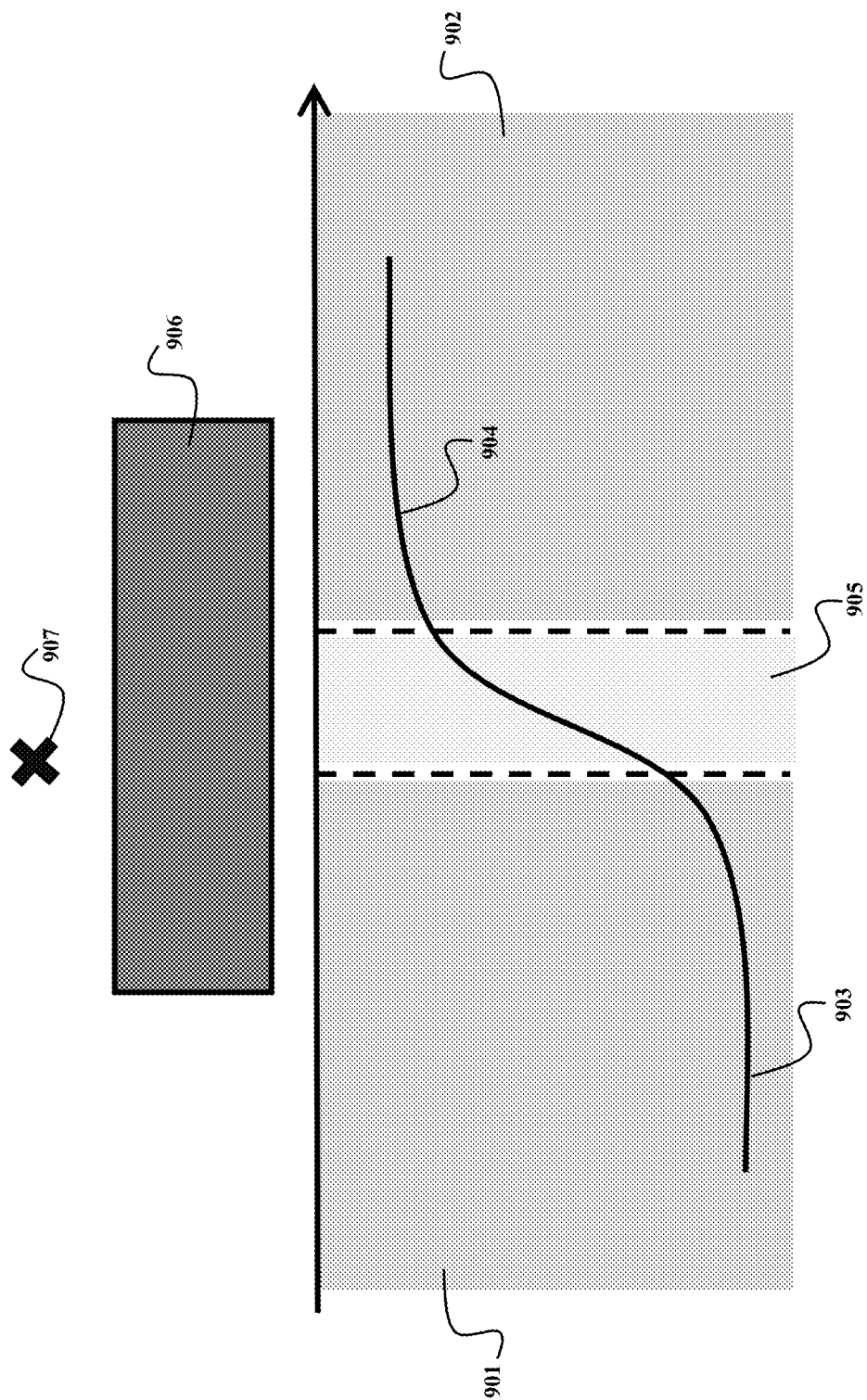
FIG. 9 illustrates an approximation of a prediction model predicting continuous variables for a discontinuous function in the collision avoidance mode, according to some embodiments of the present disclosure.

FIG. 9 illustrates approximation of a prediction model predicting continuous variables for a discontinuous function in the collision avoidance mode, according to the embodiments of the present disclosure. In FIG. 9, there is shown an obstacle 906 and a goal position 907 for one or more devices.

In operation, an expected behavior of a continuous prediction model may be obtained by an ML module (e.g., the ML module 704) using a neural network. For initial conditions, strongly to a left side 901 and strongly to a right side 902 of a center of the obstacle 906, the ML module may produce a correct result of circling to the left side 903 and to the right side 904 towards the goal position 907. But for a region of intermediate values 905, a resulting trajectory may not bend enough. Hence, the resulting trajectory will go through the obstacle, causing a collision. Therefore, the solution of the approach as described with reference to FIG. 7 cannot guarantee to provide feasible trajectories for the multi-device motion planning problem.

Some embodiments are based on further realization that existing alternative approaches only use the ML modules to initialize an MIP solver achieving a warm starting. A schematic of such an approach is illustrated in FIG. 10.

Figure 10:
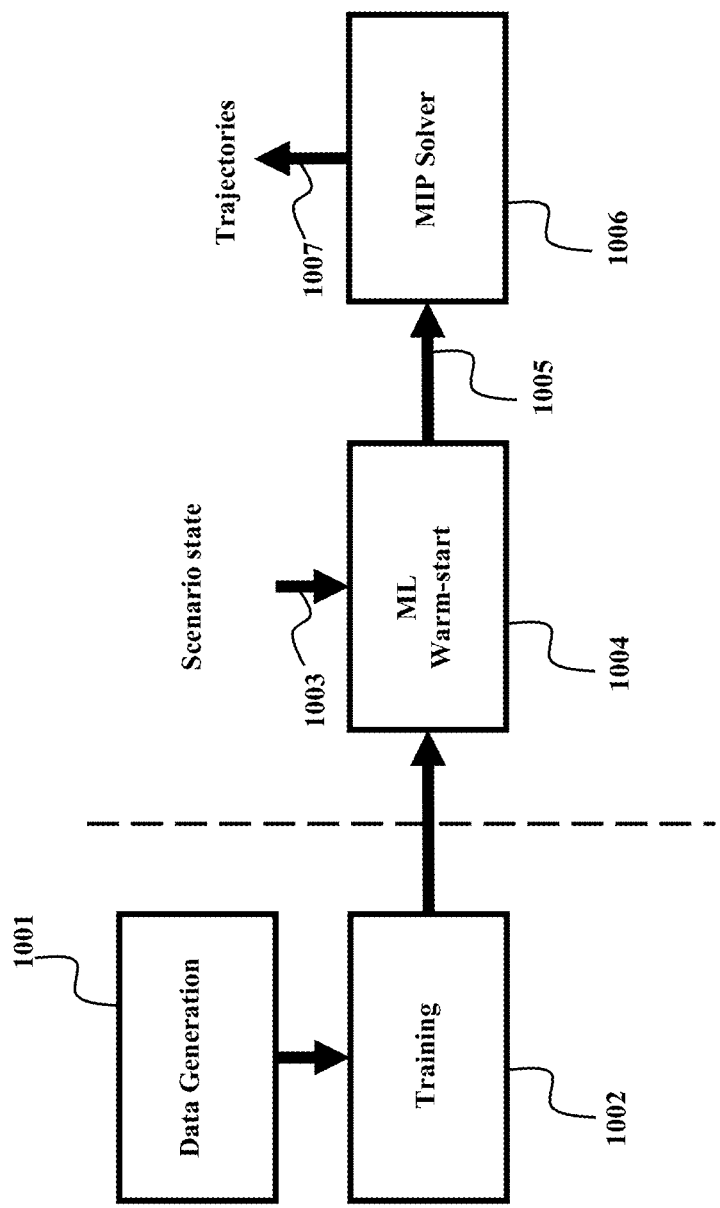
FIG. 10 illustrates a flow diagram for solving the multi-device planning problem by using on the ML module to warm start an MIP solver module, according to some embodiments of the present disclosure.

FIG. 10 illustrates a flow diagram for solving the multi-device planning problem based on using the ML module to warm start an MIP solver module, according to the embodiments of the present disclosure. As shown in FIG. 10, data is acquired 1001, for instance, by solving in simulation the multi-device motion planning problem for different scenario states defining parameters of the task including ome or a combination of the device initial positions, goals, and obstacle centers and/or obstacle dimensions. Further, the acquired data is used to train 1002 an ML module containing a prediction model based on a neural network. During operation, a scenario state is received 1003, and the ML module 1004 computes a warm start candidate solution 1005 for an MIP solver 1006. The MIP solver 1006 uses the warm start candidate solution 1005 to speed up computation of the trajectories 1007 for the multi-device motion planning problem. Accordingly, the trajectories are correctly computed such that they are both feasible and optimal. Since the trajectories are a solution to the MIP problem, this approach of using the computed trajectories for a warm start can often reduce the computational burden. However, such reduction is based on receiving an integer feasible solution from the ML module, which is not necessarily the case because of the previously mentioned continuous nature of common ML architectures. While the warm start requires an integer feasible solution to have all values of binary variables being either 0 or 1, the continuous approximate solution will include intermediate values between 0 and 1. Applying quantization or rounding schemes based on choosing an integer value from a real value, will not necessarily provide a useful warm start candidate solution, because that solution may be rendered infeasible with respect to one or multiple constraints. In addition, the computational burden on the MIP solver 1006 after warm starting may be unchanged or even become larger, due to the candidate solution forcing the exploration of certain parts of the branch and bound tree as shown in FIG. 6 which would not be explored with a cold start, i.e., without the input from the ML module. Furthermore, some embodiments require a full MIP solver 1006, and hence the reduction of computational and memory requirements is in general insufficient for multi-device motion planning.

Fast Computation of Solution of Multi-Device Motion Planning Problems by Partial Variable Fixing In the present disclosure, some embodiments are based on the realization that trajectories for the multi-device motion planning problem with limited computational and memory burden are obtained by leveraging an ML module to fix only part of the variables of the mixed-integer optimization problem. Specifically, only some or all of the integer variables are fixed, because the number of relaxed problems that need to be solved in the branch and bound tree of FIG. 6 decreases exponentially with the decrease of the number of integer variables in the MIP problem. In fact, if all the integer variables are fixed, only one real-valued optimization problem needs to be solved and the computational and memory requirements can therefore be reduced considerably. In some embodiments, some or all of the integer variables in the MIP problem are binary variables.

In some embodiments, the value of some or all of the integer variables are extracted from an ML module that predicts the trajectories of the one or more devices, yet the ML module does not explicitly predict the integer variables. In some embodiments, after the integer variables are fixed, desirable trajectories for the multi-device motion planning problem are obtained by solving a single real-valued optimization problem. The solution of the real-valued optimization problem can be obtained using standard methods for real-valued mathematical programming, such as an interior point method, a gradient-based method, alternating direction method of multipliers (ADMM), active set method, or simplex method. In some embodiments, a fixed number of real-valued optimization problems is solved for different future planning time horizon lengths, in order to compute a time-optimal trajectory for each of the devices. In some embodiments, only some of the integer variables are fixed, such that a reduced MIP problem needs to be solved to compute the trajectories for each of the devices, resulting in a considerable reduction of the number of relaxed problem solutions and therefore a considerable reduction in the computational and memory requirements of the multi-device motion planning Finally, in the present disclosure, some embodiments are based on the realization that a success rate of the proposed method is increased by training the ML module favoring the generation of trajectories that are close-to-feasible, as opposed to close-to-optimal, which can be accomplished by focused sampling and by modifying the loss function used for training to include barrier terms for collision avoidance.

Additionally, some embodiments are based on the realization that a repeated evaluation of the ML module initialized at different predicted steps is more likely to provide a feasible solution to the multi-device motion planning problem. The latter is due to the prediction model producing an approximated trajectory so that if such approximated trajectory is predicted to experience a collision at some future step, re-evaluating the ML module from a future predicted step before the collision will return a differently approximated trajectory which is likely to avoid one or multiple of the previously predicted collisions. Further, operation of the system based on the realizations of the present disclosure is illustrated in FIG. 11.

Figure 11:
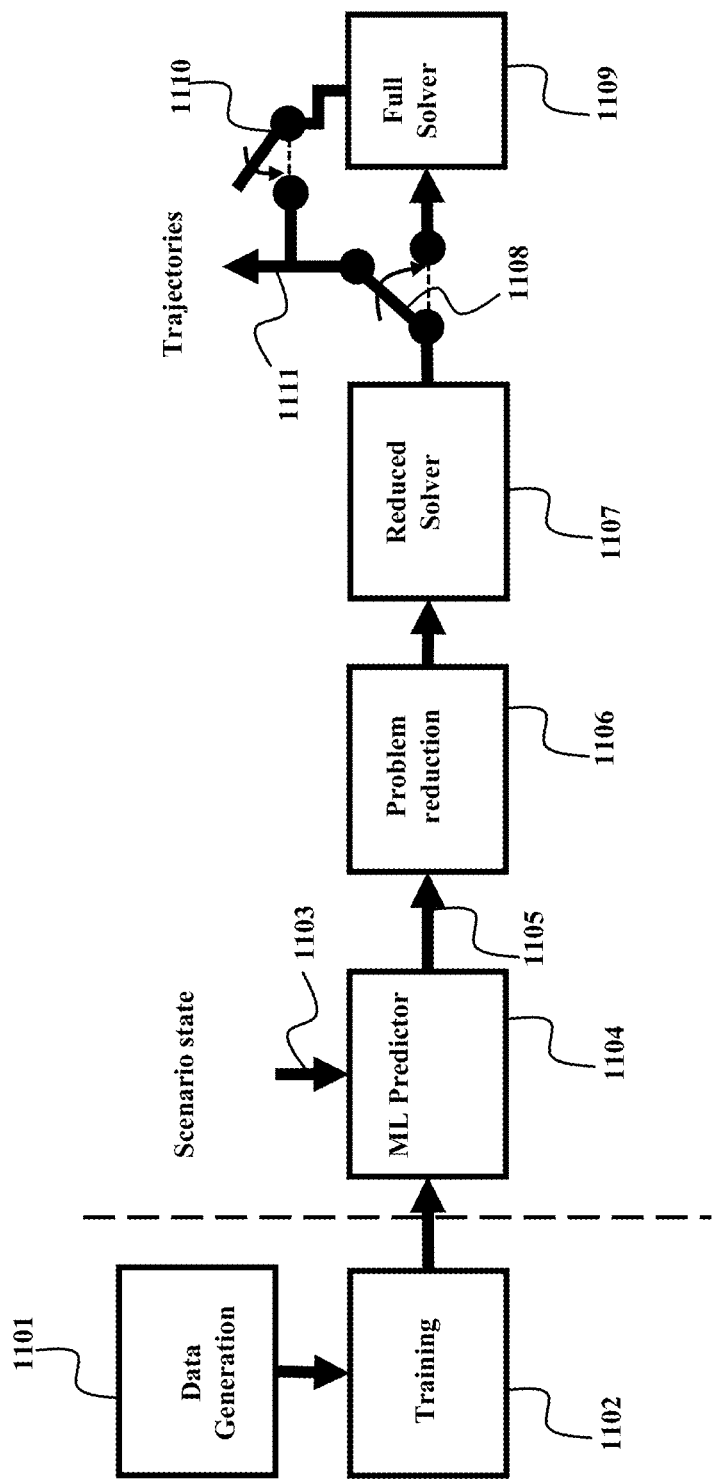
FIG. 11 illustrates a flow diagram for solving the multi-device planning problem by using the ML module to predict trajectories, according to some embodiments of the present disclosure.

FIG. 11 illustrates a flow diagram for solving the multi-device planning problem by using the ML module to predict trajectories, according to the embodiments of the present disclosure. In some embodiments, the predicted trajectories are used to solve a reduced problem, where integer variables are fixed. During configuration, a data generation module 1101 uses focused sampling to select data to be acquired, which is used in a training module 1102 for training the prediction model into an ML module 1104 (also referred to as "ML predictor") using a loss function that includes barrier terms for increasing feasibility.

Some embodiments are based on the realization that the configuration, i.e., the data generation 1101 and the training module 1102, can be performed offline and do not need to be implemented in an embedded processing unit (EPU) and therefore these components do not affect the computational and memory resources that are required for multi-device motion planning During operation, a scenario state is received 1103, and the ML module 1104 computes predicted trajectories 1105 from which a problem reduction module 1106 extracts variables such that some or all the integer variables are fixed. Based on the predicted trajectories, motions of one or multiple devices are planned such that the one or multiple devices do not collide with either obstacles or each other.

To extract at least some of the integer values, the problem reduction module 1106 may formulate the mixed-integer optimization problem that searches for a global optimal solution within a search space determined by the constraints defined by equations (2) to (6). The mixed-integer optimization problem is further transformed into a real-valued optimization problem by fixing integer variables of the mixed-integer optimization problem to the integer values extracted by the problem reduction module 1106. Further, a solution of the mixed-integer optimization problem is determined from the solution of the real-valued optimization problem by adding the fixed values of the integer variables.

In the formulation of the mixed-integer optimization problem, at least some of the integer variables are binary. Further, at least some of the integer variables are associated with groups of disjunctive constraints of real-valued variables for the avoidance of collisions between the one or multiple devices and obstacles, and among the one or multiple devices. When one of the constraints of real-valued variables in the groups of disjunctive constraints is satisfied at a specific time instant, the collision with the corresponding obstacle or another device of the one or multiple devices is avoided at the specific instant.

Further, an admissibility of a value of at least some integer variables partitioning the search space of the mixed-integer optimization is evaluated based on the predicted (or estimated) motion trajectory 1105 for performing the task of changing the state of the one or multiple devices. The admissibility of values of the at least some integer variables of the mixed-integer optimization problem is tested by determining a membership of at least some parts of the estimated motion trajectory 1105 to regions determined by the constraints of real-valued variables. The constraints of the real-valued variables define the obstacles or the other devices of the one or multiple devices.

In some embodiments, the region of the obstacles and the one or multiple devices are defined by one or more constraints of real-valued variables and parameters of the task. The one or more constraints of the real-valued variables are linear in state variables. Further, each constraint of the one or more constraints of real-valued variables, defining the region of the obstacles is associated with at least one binary variable indicating whether the constraint is satisfied at a specific time instant, where the admissibility of a valued of the at least one binary variable associated with the constraint is tested. To that end, it is determined whether the estimated motion trajectory 1105 satisfies the constraint to which the integer variable is associated at the specific time instant.

Still referring to FIG. 11, a reduced solver module 1107 for the reduced problem computes trajectories that solve the multi-device motion planning problem. Such trajectories are called optimized motion trajectories, where the optimized motion trajectories 1108 may be used immediately or used as a feasible warm start for a full-solver module 1109, which may solve the full MIP problem for a fixed number of nodes and produce a further improved solution 1110. Further, the optimized motion trajectories 1108 are updated or refined based on the solution of the MIP warm-started based on the optimized motion trajectories 1108. In some embodiments, the optimized motion trajectories are updated by solving or refining the mixed-integer optimization problem warm-started based on the optimized motion trajectory in response to detecting that there is time available before the instant at which the optimized motion trajectory computation must be completed. Further, the optimized motion trajectory 1108 is produced from the solution with the lowest cost computed by time (also called as "an available time period") that optimized motion trajectory computation must be completed.

Further, depending on whether the refinement is done or not, trajectories 1111 are assigned to be the optimized trajectories 1108 obtained from the reduced solver module 1107 or trajectories 1110 from the full MIP solver module 1109.

Some embodiments of the disclosure are based on the realization that the operation, i.e., the ML prediction 1104, the problem reduction 1106, and the reduced solver 1107, needs to be performed online and implemented in an EPU for multi-device motion planning, but these components require a considerably reduced amount of computational and memory resources for multi-device motion planning. In some embodiments, the ML module 1104, the problem reduction module 1106, the reduced solver module 1107, and the full solver module 1109 are comprised by the controller 111 (FIG. 1).

In some embodiments, the full solver module 1109 may be a part of the online operation of the multi-device motion planning system, and the computational and memory resources for the full solver module 1109 may be bounded by limiting the number of iterations in the optimization algorithm, for example, by limiting the number of nodes in the branch and bound tree.

The data generation module 1101 generates samples of at least one among devices initial conditions, goals, and obstacle center positions and/or obstacle dimensions, obtaining data tuples $$\{(x_0^{i,r})_{i=1}^{n_a}, (x_{goal}^{i,r})_{i=1}^{n_a}, (\vartheta^{j,r})_{j=1}^{n_o}\} \qquad (9)$$

Based on such a tuple, the full mixed integer program (8) is built and solved. The optimal solution $\xi_r^*$ contains the state, input and position trajectories, and all the integer or binary variables. First, the data generation module removes all solutions and corresponding data tuples that result in infeasible solutions, $\xi_r^* = \infty$. When the infeasible solution $\xi_r^* = \infty$ or infeasibility of the estimated motion trajectory 1105 is detected, the parameters of the task of changing the state of the one or multiple devices are updated by changing the state of the one or multiple devices according to a portion of the infeasible estimated motion trajectory 1105. Further, steps for estimating the optimized motion trajectories 1108 are repeated for the updated parameters of the task. To detect the infeasibility of the estimated motion trajectory 1105, the estimated motion trajectory 1105 is evaluated to determine whether the estimated motion trajectory 1105 causes at least one collision among devices of the one or multiple devices or between a device of the one or multiple devices and an obstacle.

After removing the infeasible solution $\xi_r^* = \infty$, the remaining data tuples with feasible solutions, with their corresponding optimal state trajectories for a future horizon of N-steps for all devices $$\{((x_k^{i,r*})_{k=0}^T)_{i=1}^{n_a}\} \qquad (10)$$

is collected to build a training dataset for a prediction model in the ML module 1104

$$\{(x_0^{i,r})_{i=1}^{n_a}, (x_{goal}^{i,r})_{i=1}^{n_a}, (\vartheta^{j,r})_{j=1}^{n_o}, ((x_k^{i,r*})_{k=0}^T)_{i=1}^{n_a}\}_{r=1}^{N_D} \qquad (11).$$

Figure 12A:
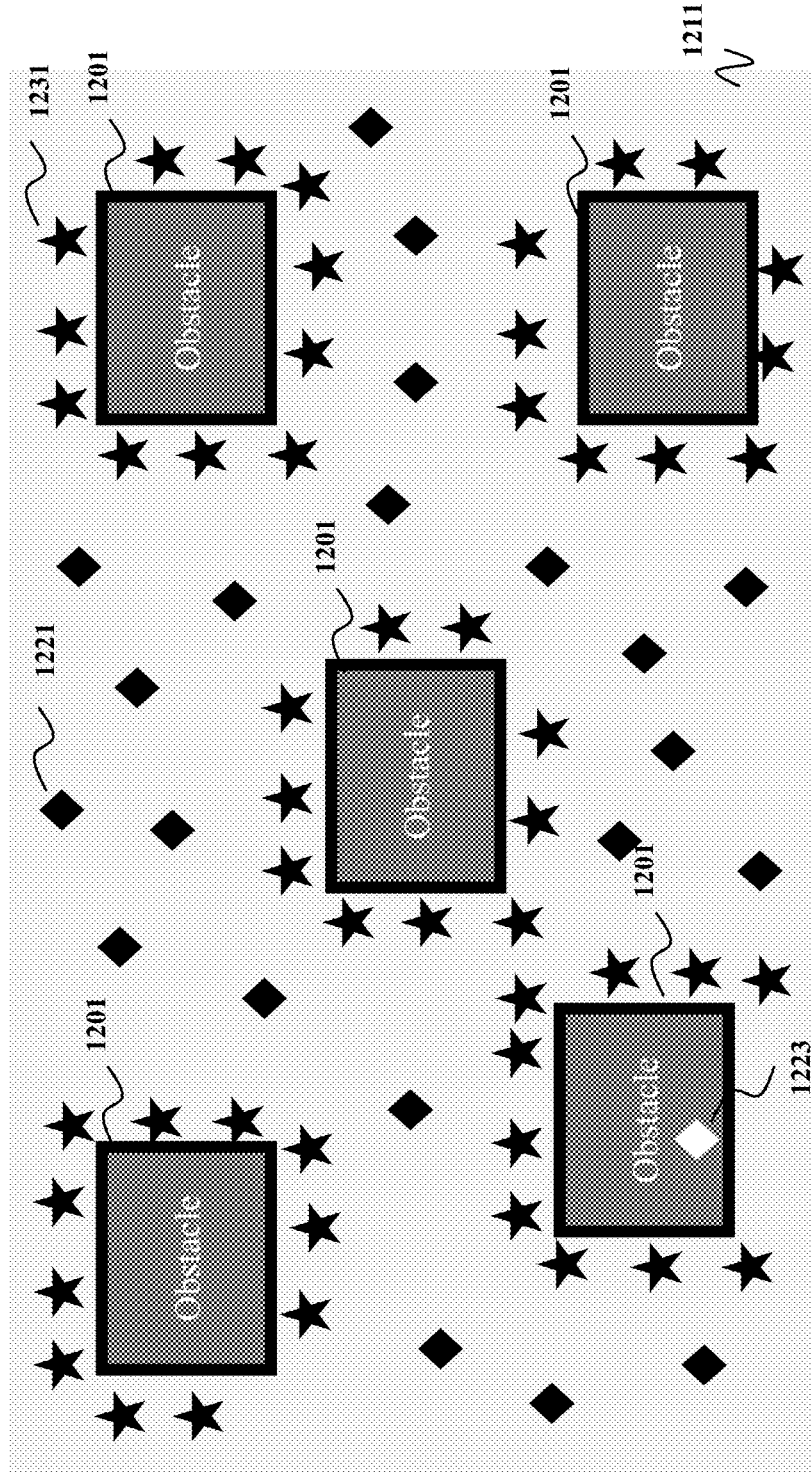
FIG. 12A shows a schematic for data collection using focused sampling, according to some embodiments of the present disclosure.

FIG. 12A shows a schematic for data collection using focused sampling, according to the embodiments of the present disclosure. In particular, FIG. 12A demonstrates the principle of the focused sampling for collecting the data tuples (9). According to some embodiments, the focused sampler is based on the realization that it is required to generate more data tuples with states that are close, in position, to the obstacles 1201 within the environment 1211. This enables us to explicitly minimize the training loss in areas near the obstacles 1201, where the trajectories are likely to change rapidly, and possibly discontinuously, with respect to the initial states of the devices. To this end, a multi-step sampling strategy is enacted, wherein a pre-defined number of initial samples 1221 are generated using a standard sampling methodology from which data tuples are extracted. Some examples of sampling methodologies include uniform distribution, sparse grids, or low-discrepancy sequences defined on the state-space of interest. Of these initial samples, some samples are infeasible as they are overlapping with the obstacles: these infeasible samples 1223 are removed from the dataset since they do not contribute to the training loss. After this first level of sampling, another set of samples that are focused near the obstacles are generated: these samples 1231 are drawn from a focused sampler. To reiterate, some embodiments at first randomly sample $(\vartheta^j, x_{goal}^i)$ with $j \in \mathcal{O}$, $i = \mathcal{J}$, then select neighborhoods of the obstacles and randomly sample $x_0^i$, $i \in \mathcal{J}$, in such neighborhoods. Some embodiments of focused samplers 1251 are describe further with reference to FIG. 12B.

Figure 12B:
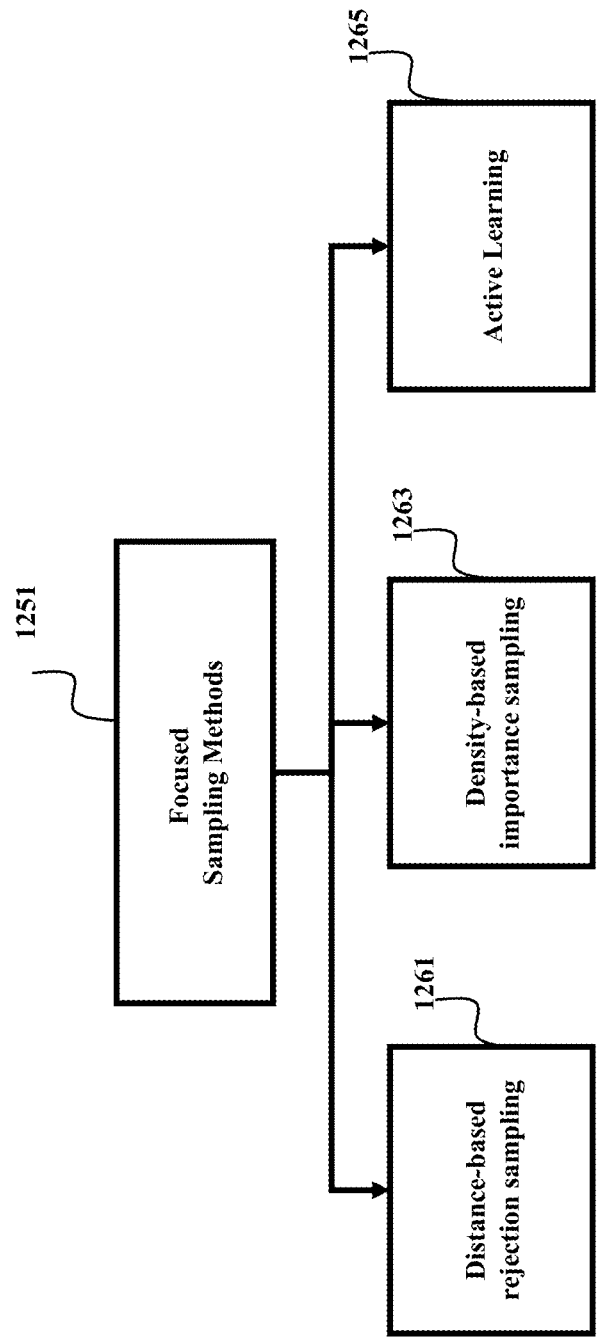
FIG. 12B shows various focused sampling methodologies, according to the embodiments of some present disclosure.

FIG. 12B shows various focused sampling methodologies, according to the embodiments of the present disclosure. One embodiment employs distance-based focused sampling, wherein the focused samples are generated by distance-based rejection sampling 1261. This involves generating a sample $x_0^i$ on the admissible state-space, determining whether $x_0^i$ is within a neighborhood of any obstacle based on a pre-defined neighborhood for a pre-defined distance metric, and rejecting the sample if it is outside the prescribed neighborhood. By performing rejection sampling repeatedly, the focused sampler generates $x_0^i$ that are biased to be positioned near to the obstacles. A neural network (such as the neural network 112 of the controller 111 as shown in FIG. 1) is trained with training data including the samples $x_0^i$ on a search space of the parameters of the task labeled with an optimal solution of the mixed-integer optimization problem. The samples $x_0^i$ include a set of regular samples and a set of biased samples, where the set of biased samples are biased towards the constraint.

Another embodiment of the focused sampler involves density-based importance sampling 1263 from a distribution that is designed taking the obstacle positions into account. According to this embodiment, a distribution $\xi_{imp}(x_0^i)$ on the state-space of interest is constructed such that the probability of selecting a data point increases as the focused sampler 1251 gets closer to the obstacle. For instance, such a distribution can be generated efficiently via kernelized density estimation methods and extracting samples from such a skewed distribution automatically focuses samples on close proximity to the obstacle.

Another embodiment of focused sampling involves active learning 1265, wherein the initial set of data is used for constructing a learner, which subsequently chooses the next batch of samples that contain the most useful information (for example, according to an entropy measure). By repeated learning and batch selection, the data collected will comprise focused samples around the most informative regions of the state-space.

The training dataset is used in the training module 1102 to train the prediction model in the ML module 1104, which contains a prediction model, such as a neural network, for the trajectories of the multiple devices based on the scenario data $\{(x^i(t))_{i=1}^{n_a}, (x_{goal}^i(t))_{i=1}^{n_a}, (\vartheta^j(t))_{j=1}^{n_o}\}$.

Figure 13A:
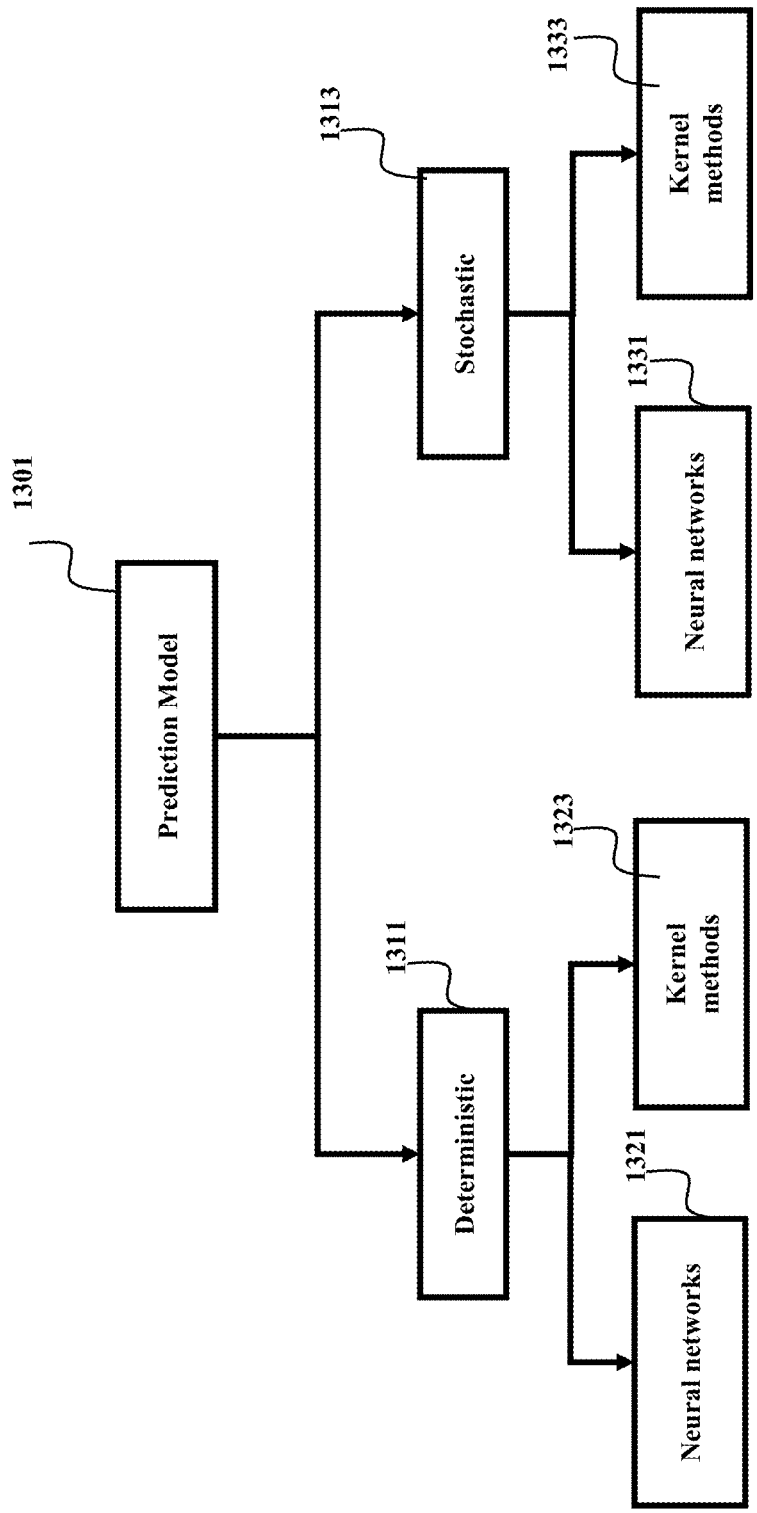
FIG. 13A shows learning algorithms for the prediction model, according to some embodiments of the present disclosure.

FIG. 13A shows learning algorithms for the prediction model, according to the embodiments of the present disclosure. In particular, FIG. 13A encapsulates various prediction models 1301 that may be trained to generate trajectories. The prediction models may be deterministic 1311 or stochastic 1313 and may rely on neural architectures 1321/1331 or kernel representations 1323/1833. Examples of deterministic prediction models include multi-layer perceptron, convolutional neural networks 1321, kernel regression and support vector machines 1323, and the like. Examples of stochastic prediction models include Bayesian neural networks, neural processes 1331, Gaussian processes, Kriging interpolation 1333, and the like. One embodiment described in FIG. 13B uses a deep neural network as a prediction model.

Figure 13B:
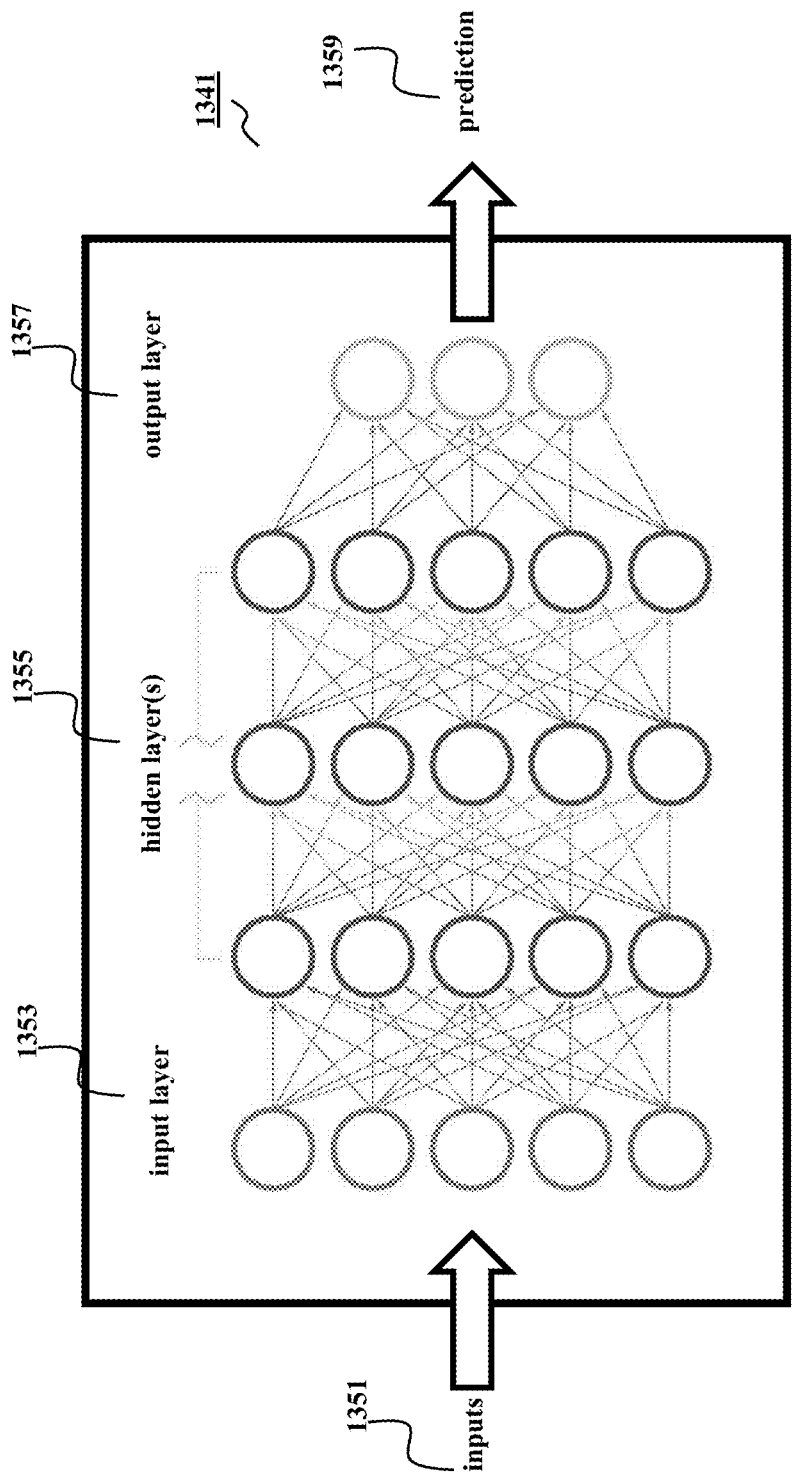
FIG. 13B shows a schematic of layers and signals involved in a deep neural network for the prediction model, according to some embodiments of the present disclosure.

FIG. 13B shows a schematic of layers and signals involved in a deep neural network 1341, according to the embodiments of the present disclosure. From the data collected for training, an input signal 1351 is provided to the deep neural network 1341 through the input layer 1353 which is typically a feature extraction layer and may be linear or comprise convolutional filters in order to automatically extract useful characteristics from the input signal 1351. For a linear input layer, the transformation is linear, and the feature $$f_0 W_0^T X + w_0 \qquad (12a)$$

where $W_0$ and $w_0$ form the weights and biases of the input layer and X is the input to the deep neural network 1341. Consequently, the features are passed through multiple hidden layers 1355 (typically larger than 3 for a deep neural network), and they are transformed via activation functions $\alpha(\cdot)$ such as rectified linear units (ReLUs), sigmoid functions, or modifications and combinations thereof. One can represent the operations occurring in the hidden layers using compositions of functions, where the output from the final hidden layer is given by $$f_n = \alpha_n \circ \ldots \circ \alpha_2 (W_2^T \alpha_1 (W_1^T \alpha_0 (f_0) + w_1) + w_2). \qquad (12b)$$

The output layer 1357 is used here for regression and therefore, can be linear, so the prediction output 1359 becomes $$Y = W_\infty^T f_n + w_\infty \qquad (12c)$$

and training the deep neural network 1341 involves obtaining good values of the weights and biases in the input layer 1353, in the output layer 1357 and in each of the hidden layers 1355.

While common training methods for prediction models aim at minimizing the training error of the prediction model equally in every direction, in this disclosure it is realized that for multi-device motion planning, the training error should be minimized primarily in the directions that cause violations of the constraints that determine collision avoidance, since violating those constraints causes critical damage to the devices, while other errors cause only a performance degradation.

Figure 14:
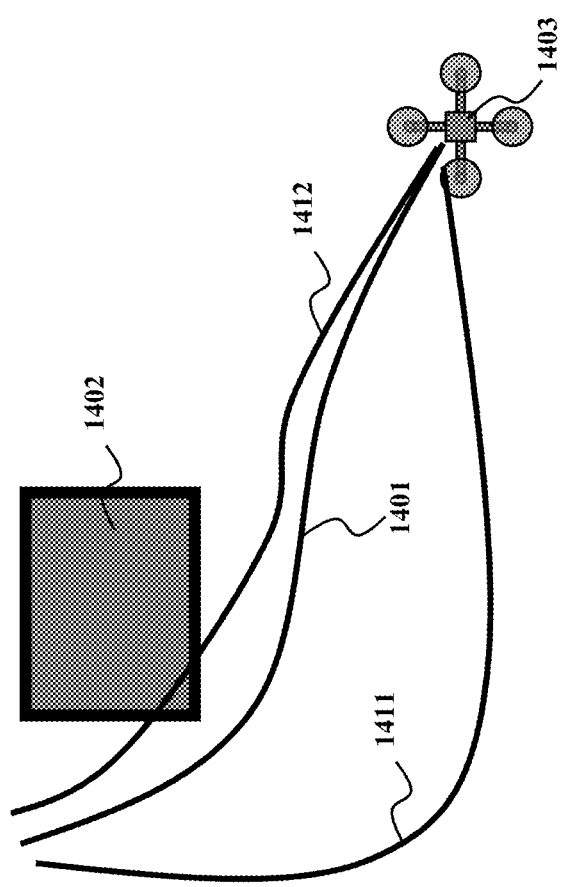
FIG. 14 illustrates errors in the predicted trajectory with respect to the collision avoidance, according to some embodiments of the present disclosure.

FIG. 14 shows an illustration of the predicted trajectory errors with respect to collision avoidance, according to the embodiments of the present disclosure. FIG. 14 shows an optimal trajectory for training 1401 and a learned trajectory 1411 with an error that moves away from the obstacle 1402. Hence, the learned trajectory 1411 only causes performance degradation. FIG. 14 further, shows a learned trajectory 1412 with an error that moves towards the constraint and actually violates the constraints. Hence, the learned trajectory 1412 causes collision of the device 1403 with the obstacle 1402.

Some embodiments are based on the realization that to achieve asymmetric training errors, a standard loss function can be modified for training, for instance, based on mean squared error (MSE) between trajectory in the dataset and obtained trajectory from the prediction model in the ML module $$\mathcal{L}_{MSE} = \frac{1}{NTN_D} \sum_{r=1}^{N_D} \sum_{i=1}^{n_a} \sum_{k=0}^{T} \|\hat{x}_k^{i,r} - x_k^{i,r}\|_2^2, \qquad (13)$$

by adding a device-obstacle collision term that penalizes training errors that lead to a device colliding with an obstacle $$\mathcal{L}_{IAC} = \frac{1}{NTN_D} \sum_{r=1}^{N_D} \sum_{i=1}^{n_a} \sum_{l=1, l\neq i}^{n_a} \sum_{k=0}^{T} \phi_a^j(\hat{z}_k^{i,r}), \quad (14)$$

and an inter-device collision term that penalizes training errors that lead to a device colliding with another device $$\mathcal{L}_{AOC} = \frac{1}{NTN_D} \sum_{r=1}^{N_D} \sum_{i=1}^{n_a} \sum_{j=1}^{n_o} \sum_{k=0}^{T} \phi_o^j(\hat{z}_k^{i,r}), \quad (15)$$

where in (14), (15) the functions $\phi_o^j$, $\phi_a^j$ are barrier functions, that is, functions that approximate the behavior of being 0 outside of the region of the obstacle, and a positive constant inside the region of the obstacle, while being continuous and continuously differentiable. An example of such behavior is obtained by $$\phi_\star^j(\hat{z}_k^{i,r}) = \frac{\pi}{2} - \tan^{-1}\left(\alpha\left(\left\|\hat{z}_k^{i,r} - C_j\right\|_{P_j}^2 - 1\right)\right), \quad (16)$$

where $P_j$, $C_j$ and a are the shape matrix, center, and scaling factor of the ellipsoid $(\hat{z}_k^{i,r}-C_j)^T P_m (\hat{z}_k^{i,r}-C_j) \leq 1/\alpha$ that covers the region of the j-th obstacle.

Figure 15:
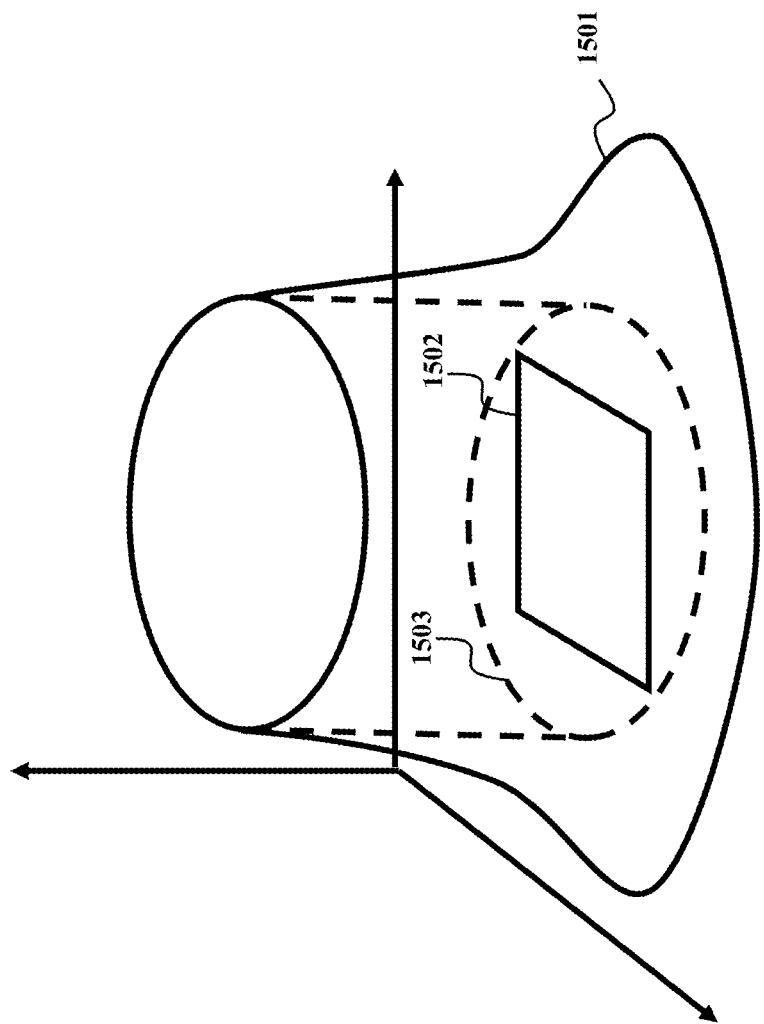
FIG. 15 illustrates a barrier function for collision avoidance, according to some embodiments of the present disclosure.

FIG. 15 illustrates a barrier function 1501 for collision avoidance, according to the embodiments of the present disclosure. FIG. 15 is described in conjunction with FIG. 11. In FIG. 15 the barrier function 1501 for an obstacle 1502, based on an ellipsoid 1503 containing the obstacle 1502 is shown. The barrier function 1501 has a small value at a large distance from the region where a constraint is violated and a large value in the region where the constraint is violated. The barrier function 1501 grows rapidly from the small value to the large value in a region at a small distance from the region where the constraint is violated, and the barrier function 1501 is non-decreasing with respect to the distance of the area where the constraint is violated.

Figure 16:
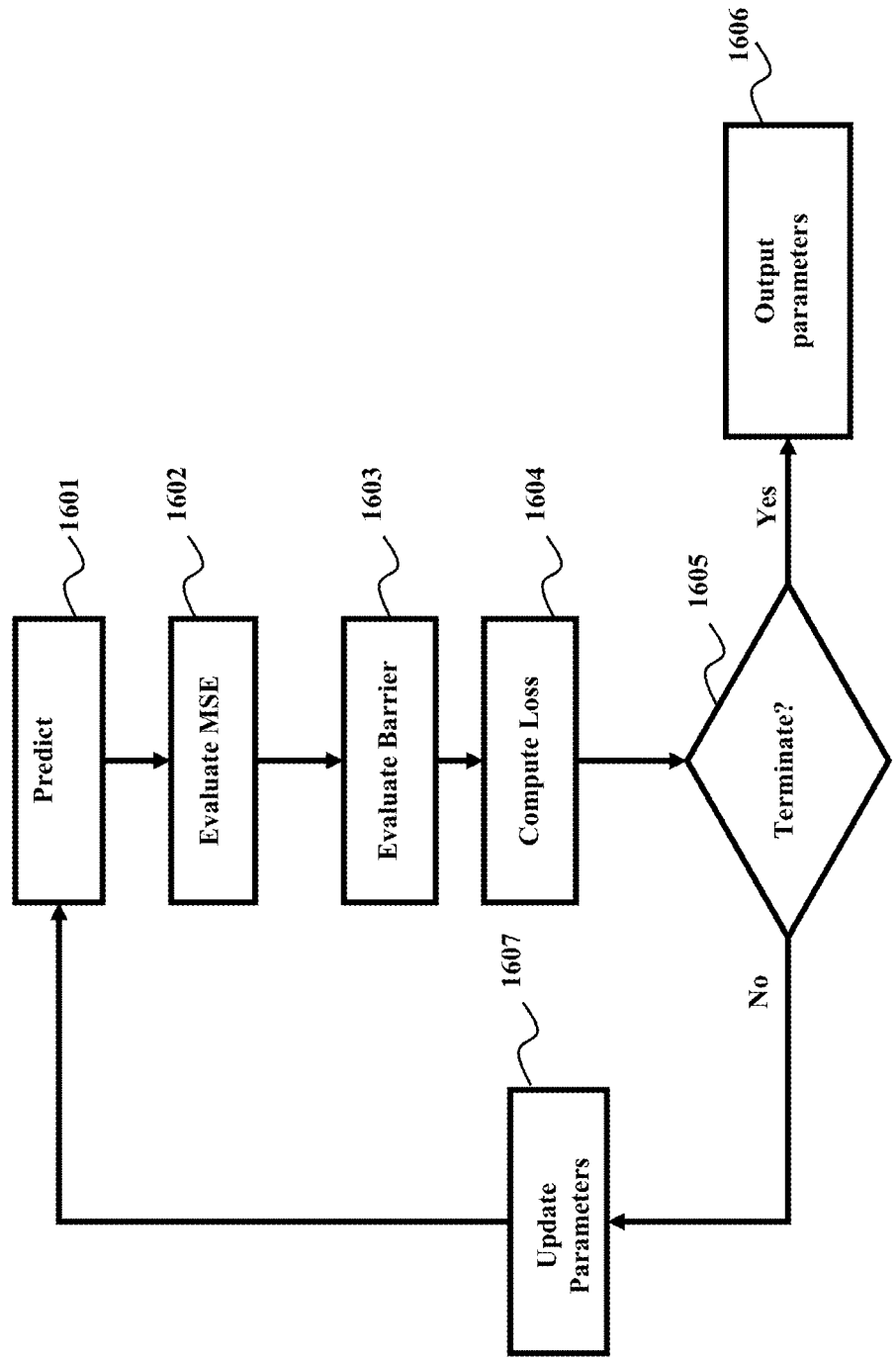
FIG. 16 shows a flow diagram of an algorithm for updating the prediction model parameter when the loss function includes barrier function terms, according to some embodiments of the present disclosure.

Thus, the training module 1102 trains the prediction model in the ML module 1104 by adjusting the value of the parameters, for example, the weights and biases in a neural network, such that the loss function $$\mathcal{L} = w_{MSE}\mathcal{L}_{MSE} + w_{aoc}\mathcal{L}_{aoc} + w_{iac}\mathcal{L}_{iac} \quad (17)$$

is reduced, where $w_{MSE}$, $w_{aoc}$, $w_{iac}$ are positive scalar weights. The operation of the training module 1102 using the barrier terms in the loss function (also referred to as "reconstruction loss function") according to some embodiments of the present disclosure is shown in FIG. 16. Thus, the reconstruction loss function is modified with the barrier function 1501. The reconstruction loss function modified with the barrier function 1501 is used to train the neural network. The modification with the barrier function 1501 increases the value of the reconstruction loss based on a distance of the state of the one or multiple devices to a region where the constraint on the motion of the one or multiple devices is violated.

FIG. 16 shows a flow diagram for an algorithm for updating the prediction model parameter when the loss function includes barrier function terms, according to the embodiments of the present disclosure. FIG. 16 is described in conjunction with FIG. 11. The algorithm starts from step 1601.

At step 1601, the current prediction of the prediction model is evaluated. Further, at step 1602, the MSE cost is computed. At step 1603, the barrier costs are computed, and at step 1604, the total loss function is computed. At step 1605, termination conditions are checked. If the termination conditions, such as total number of updates or progress obtained by the updates, are achieved, at step 1606 the training module terminates and returns the current best prediction model parameters. Otherwise, it updates the parameters at step 1607. In some embodiments, each update of the model parameters 1607 is performed by a stochastic gradient descent algorithm or any variant thereof such as the Adam optimization algorithm.

During online operation of the multi-device planning system, the ML module 1104 containing a prediction model trained by the training module 1102 receives the data of the current scenario 1103 consisting of the state of the devices, goal of the devices, and centers and/or dimensions of the obstacles at current time t $$\{(x^i(t))_{i=1}^{n_a}, (x_{goal}^i(t))_{i=1}^{n_a}, (\vartheta^j(t))_{j=1}^{n_o}\} \quad (18)$$

and evaluates the prediction model 1104 obtaining a state predicted trajectory 1105 for a future horizon of T steps for the $n_a$ devices $$(\hat{x}^i(t+k))_{k=0}^{T} i=1,\ldots,n_a \quad (19)$$

Some embodiments are based on the realization that even if the aim is to predict the values of some or all integer variables in the problem reduction module 1106, it is more convenient to predict device state trajectories. This is due to the realization that integer variables can be reconstructed from the device state trajectories, and the state trajectories have lower dimensions and fewer constraints between their vector components. Instead, the set of integer variables is much larger: for each device, for each time step, for each obstacle, and for each side there is one integer variable, as opposed to for each device, and for each time step there is a state vector. Also, the integer variables are discrete-valued, so that they are not easily predicted by a continuous real-valued prediction model and are subject to relative constraints that cannot be enforced easily within the prediction model. Accordingly, predicting real-valued state trajectories requires less data and a simpler prediction model, i.e., with fewer equations, and creates fewer and less critical prediction errors.

Despite using a training loss function with additional barrier terms, it is possible that the predicted trajectories may be experiencing collisions. However, in the present disclosure, some embodiments are based on the realization that collisions experienced by the predicted trajectories are still due to the approximation of the continuous prediction model in predicting a discontinuous solution. As the region where the discontinuity happens is limited, small perturbations to the state from which the predicted trajectory is computed may cause its re-computation to avoid collisions. Thus, in some embodiments, the ML module operates as a receding horizon implementation as shown in FIG. 17.

Figure 17:
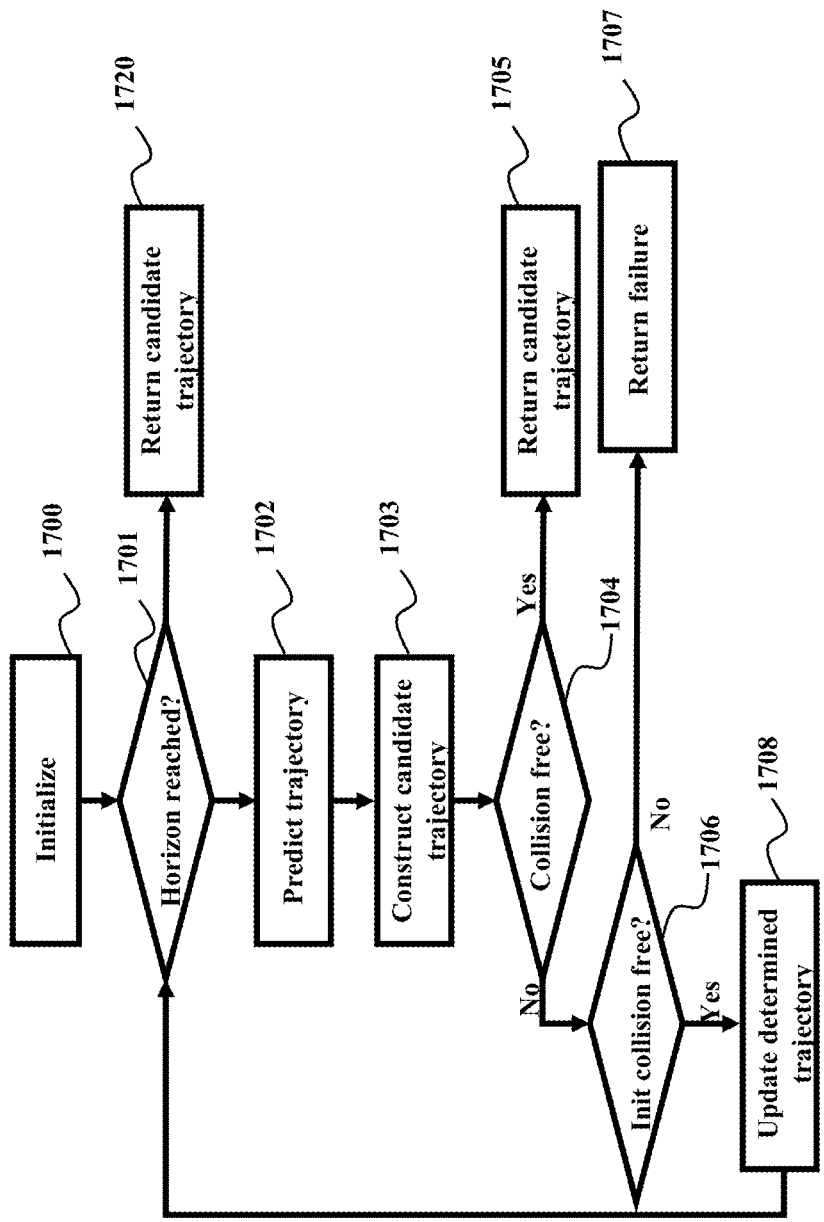
FIG. 17 shows a flow diagram for an algorithm for predicting trajectories in the ML module, according to the embodiments of some present disclosure.

FIG. 17 shows a flow diagram for an algorithm for predicting trajectories in the ML module, according to the embodiments of the present disclosure. At step 1700, initialization sets the goals to $x_{goal}^i(t)$, $i=1,\ldots,n_a$, the obstacle centers and/or dimensions to $\vartheta^j(t)$, $j=1,\ldots,n_o$, the step counter to S=0, and the determined trajectories to the device initial states $\mathcal{T}=x^i(t)$, $i=1,\ldots,n_a$.

At step 1701, the ML module checks whether the counter S has reached horizon T. If the counter S has reached the horizon T, at step 1720, the ML module returns the determined trajectory for each of the devices. The prediction model 1104 is evaluated using the last state for each device in $\mathcal{T}$, the goals, and the obstacle centers and/or dimensions.

At step 1702, the predicted trajectories are obtained $(\hat{x}^i(t+S+k))_{k=0}^T$ i=1, ..., $n_a$. At step 1703, a set of candidate trajectories) $\mathcal{C} = (\hat{x}^i(t+S+k))_{k=-S}^{T-S}$ i=1, ..., $n_a$ are obtained by concatenating the determined trajectories $\mathcal{T} = (\hat{x}^i(t+k))_{k=0}^S$ i=1, ..., $n_a$, which have length S steps with indices k=1, ..., T−S of the corresponding predicted trajectories $\mathcal{P} = (\hat{x}^i(t+S+k))_{k=1}^{T-S}$ i=1, ..., $n_a$.

Further, at step 1704, the ML module checks whether the candidate trajectories experience collisions between a device and an obstacle or between two devices, by evaluating whether the inequalities (4), (5a) are satisfied at any time step, respectively. If no collisions are detected, the ML module proceeds to step 1705.

At step 1705, the counter is set to S=T, the candidate trajectories are accepted and produced as the output of the ML module. Otherwise, if the collisions are detected, the ML module proceeds to step 1706.

At step 1706, the algorithm determines whether the predicted trajectories are collision-free. If the collision occurs at the step with index k=1 of the predicted trajectories, i.e., the initial step of the predicted trajectories is not collision-free, and at step 1707, a failure is returned. Otherwise, at step 1708, the first elements of the predicted trajectories ($\hat{x}^i$(t+S+1)), i=1, ..., $n_a$ are added to the determined trajectories, the counter S is increased by 1, and the operation repeats.

Some embodiments in the present disclosure are based on the realization that it is more convenient to predict real-valued state trajectories and use these real-valued state trajectories to determine the values of some or all the integer and/or binary variables because state trajectories can be predicted by a prediction model that requires less data, fewer equations, is real-valued and produces fewer and less critical errors. The problem reduction module 1106 uses trajectories $(\hat{x}^i(t+k))_{k=0}^T$ i=1, ..., $n_a$ from the ML module to determine the value of some or all the integer or binary variables as shown in FIG. 18, for example.

Figure 18:
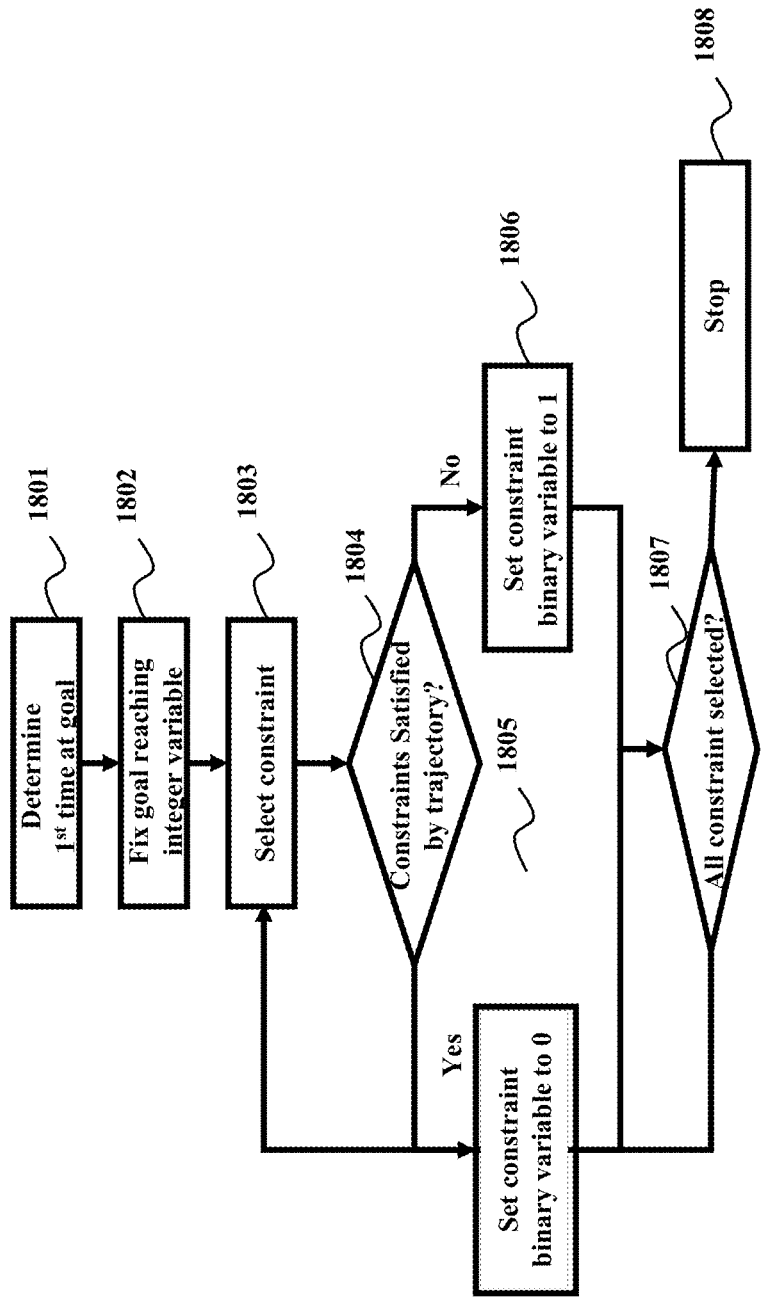
FIG. 18 shows a flow diagram for an algorithm for determining values of integer variables from trajectories predicted by the ML module, according to some embodiments of the present disclosure.

FIG. 18 shows a flow diagram for an algorithm for determining the values of integer variables from trajectories predicted by the ML module, according to the embodiments of the present disclosure. FIG. 18 is described in conjunction with FIG. 11.

At step 1801, the ML module determines the smallest time step $N_g^i$ of the trajectory at which the goal-reaching constraint is achieved for each device $\|x(t+k)^i - x_{goal}^i\|_1 \le d$.

At step 1802, the ML module fixes the binary variables for goal reaching $g_k^i$ all to 0 except for $g_k^i = 1$ for $k = N_g^i$ for each device i=1, ..., $n_a$. Then, at step 1803, a collision avoidance constraint among those in (4) and (5a) is selected.

At step 1804, it is checked whether an inequality constraint is satisfied by the predicted state trajectories at a specific time instant. If the inequality constraint is satisfied by the predicted state trajectories $(\hat{x}^i(t+k))_{k=0}^T$ i=1, ..., $n_a$, at step 1805, the value of the corresponding binary variable according to (3) and (5) is set to 0. Otherwise, if the inequality constraint is not satisfied by the predicted state trajectories, the ML module proceeds to step 1806.

At step 1806, the binary variable is set to 1. At step 1807, if all constraints in (4) and (5a) have been selected, the algorithm stops at step 1808 since the values of all binary variables have been fixed to either 0 or 1. Otherwise, it repeats the operation. The latter approach determines fixed values for all the binary variables $b_k^{i,j}$ in (3), $d_k^{i,l}$ in (5) and $g_k^i$ in (6) for each device i=1, ..., $n_a$ and at each time step k=0, ..., T.

Some embodiments are based on the realization that one or multiple integers or binary variables in the MIP problem may not be fixed by the problem reduction module 1106. Even if not all integer or binary variables are fixed, the resulting reduced MIP problem can be solved with a significantly reduced amount of computational and memory resources for multi-device motion planning. For example, in some embodiments, the binary variables $b_k^{i,j}$ in (3), $d_k^{i,l}$ in (5) are fixed by the problem reduction module 1106, but the binary variables $g_k^i$ in (6) can be determined by the reduced solver 1107 for each device i=1, ..., $n_a$ and at each time step k=0, ..., T.

In some embodiments, the collision avoidance constraints or the goal-reaching constraints may be defined differently from the mixed-integer constraints in (3), (5), and in (6), respectively, but the problem reduction module 1106 can be implemented as a procedure as described in FIG. 18 to fix some or all of the integer or binary variables in the MIP problem for the multi-device motion planning system.

The reduced solver module 1107 uses the scenario state 1103 to construct the MIP problem (8). But instead of solving this directly, it uses the values of integer or binary variables determined by the problem reduction module 1106 to fix the values of some or all the integer or binary optimization variables in the problem (8). Consequently, rather than starting from the root 601 of the branch and bound tree shown in FIG. 6, the reduced solver module starts searching for the MIP solution from a lower node, 605, 607, or even from a leaf node 650 of the tree, if all integer and binary variables are fixed. Consequently, the reduced solver solves a simpler MIP problem or even a real-valued optimization problem, if the start node is a leaf 650. This results in reduced computation time and reduced requirements for memory. The reduced solver module provides a solution $\xi^*$ which includes a conditionally optimal trajectory of device states, input, and positions $$\{((x_k^{i*})_{k=0}^T)_{i=1}^{n_a}, ((u_k^{i*})_{k=0}^T)_{i=1}^{n_a}, ((z_k^{i*})_{k=0}^T)_{i=1}^{n_a}\} \quad (20)$$

where the conditioning is due to the fixing of the integer or binary variables according to the output of the problem reduction module, and the module also provides a corresponding value of all the integer or binary variables $$\{((b_k^{i,j*})_{k=0}^T)_{i=1,j=1}^{n_a,n_o}, ((b_k^{i,l*})_{k=0}^T)_{i=1,l=1}^{n_a,n_a}, ((g_k^{i*})_{k=0}^T)_{i=1}^{n_a}\} \quad (21)$$

which is consistent with the values set by the problem reduction module 1106. By solving the reduced MIP problem, the reduced solver can correct for prediction errors in the trajectories predicted by the ML module, by changing the real-valued variables of the problem (8), and optionally by changing one or multiple of the integer or binary variables that have not yet been fixed. Thus, the reduced solver module solves a simpler problem for multi-device motion planning, but it still has control to avoid collision due to the approximated prediction of the ML module. In case the reduced problem is infeasible, an error is returned. In some embodiments, if an error is returned due to infeasibility of the reduced MIP problem, a correction to one or multiple of the values of the integer or binary variables can be computed by a heuristic or approximate optimization algorithm for mixed-integer programming. For example, a continuous optimization algorithm could be used for a smooth nonlinear relaxation of the MIP problem based on sequential convexifications to compute a feasible solution for the multi-device motion planning problem, starting from the predicted trajectories by the ML module.

In some embodiments, the reduced solver module 1107 requires the solution of one or multiple real-valued optimization problems using standard methods for real-valued mathematical programming, such as an interior point method, a gradient-based method, ADMM, active set method, or simplex method. In some embodiments, the reduced solver module 1107 requires the solution of a MIP problem with a significantly smaller amount of integer or binary variables, and a heuristic or approximate optimization algorithm can be used to compute a feasible and close to the optimal solution to the multi-device motion planning problem, for example, using rounding schemes or a feasibility pump. In other embodiments of the disclosure, the reduced solver module 1107 computes a solution to the reduced MIP problem based on a global optimization algorithm, for example, including branch and bound, branch and cut, branch and price, or similar methods based on branching and/or cutting plane strategies.

According to FIG. 11, the output of the reduced solver module 1107 may be used directly or used to warm start a full solver module 1109. In the latter case, the full solver module 1109 uses the real-valued component of the solution (20) and the integer-valued component of the solution (21) to warm start the MIP solver to compute an optimal or approximately optimal solution to the MIP problem (8). Since the solutions (20), (21) provide a feasible solution, the MIP solver in the full solver module has a feasible warm starting solution, and hence this is effective to reduce the computing time and memory that is needed to find the optimal or approximately optimal MIP solution.

Some embodiments are based on the realization that the full solver module 1109 uses an iterative procedure for mixed-integer programming that can be stopped at any time, and it will always provide a feasible solution that is at least as optimal as the warm-start solution from the reduced solver module 1107. In particular, the full solver module may explore only a fixed and relatively small number of nodes in the branch and bound tree in FIG. 6 according to the warm start, which limits its computing time and memory requirements to known numbers for multi-device motion planning on an EPU.

In case a failure is returned by the problem reduction module 1106 or by the reduced solver module 1107, each device is stopped and moved slowly away from one or multiple of the closest obstacles in a random and/or safe direction and the approach is repeated. Since the infeasibility is likely due to approximation of the discontinuities which are restricted to relatively small regions and mostly close to obstacles, a failure recovery mechanism based on a new prediction from the ML module using the updated scenario state has high probability to provide feasible trajectories for each of the devices at future time steps.

Embodiments

The description provides exemplary embodiments only and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller, for controlling a motion of at least one device, performing a task of changing a state of the at least one device, wherein the state of the at least one device includes at least a position of the at least one device, subject to a constraint on the motion of the at least one device, the controller comprising: a processor; and a memory having instructions stored thereon that, when executed by the processor, cause the controller to:
input parameters of the task including the state of the at least one device to a neural network trained to output an estimated motion trajectory for performing the task;
extract, from the estimated motion trajectory, at least some of integer values of a solution to a mixed-integer optimization problem for planning an execution of the task;
solve the mixed-integer optimization problem for the parameters of the task with corresponding integer values fixed to the extracted integer values to produce an optimized motion trajectory subject to the constraint; and
change the state of the at least one device to track to the optimized motion trajectory.

2. The controller of claim 1, wherein the parameters of the task include one or a combination of an initial position of the at least one device, a target position of the at least one device, a geometrical configuration of at least one stationary obstacle defining at least a part of the constraint, and a geometrical configuration and a motion of at least one moving obstacle defining at least a part of the constraint.

3. The controller of claim 1, wherein the at least one device is one of at least autonomous vehicles, mobile robots, aerial drones, ground vehicles, aerial vehicles, water surface vehicles or underwater vehicles.

4. The controller of claim 1, wherein to extract the at least some of the integer values, the processor is configured to:
formulate a mixed-integer optimization problem to search a global optimal solution within a search space determined by the constraint; and
evaluate an admissibility of a value of at least some integer variables partitioning the search space of the mixed-integer optimization based on the estimated motion trajectory for performing the task which is output of the neural network.

5. The controller of claim 4, wherein the processor is further configured to:
formulate a mixed-integer optimization problem, wherein at least some of the integer variables are binary,
wherein the at least some of the integer variables are associated with groups of disjunctive constraints of real valued variables for avoidance of collisions between the at least one device and obstacles, and among multiple devices including the at least one device, and
wherein when one of the constraints of real-valued variables in the groups of disjunctive constraints is satisfied at a specific time instant, the collision with the corresponding obstacle or another device of the multiple devices is avoided at the specific instant.

6. The controller of claim 5, wherein the processor is further configured to test the admissibility of values of at least some integer variables of the mixed-integer optimization problem, by determining a membership of at least some parts of the estimated motion trajectory to regions determined by the constraints of real-valued variables defining the obstacles or the other device of the multiple devices.

7. The controller of claim 6, wherein the region of the obstacles and the at least one device are defined by one or more constraints of real-valued variables that are linear in state variables, and the parameters of the task;
  wherein each constraint, of the one or more constraints of real-valued variables, defining the region of the obstacles is associated with at least one binary variable indicating whether a constraint is satisfied at a specific time instant; and
  wherein the processor is further configured to test the admissibility of a value of the at least one binary variable associated with the constraint by determining whether the estimated motion trajectory satisfies the constraint to which the integer variable is associated at the specific time instant.

8. The controller of claim 1, wherein the processor is further configured to:
  transform the mixed-integer optimization problem into a real-valued optimization problem by fixing the integer variables of the mixed-integer optimization problem to the extracted integer values; and
  determine the solution of the mixed-integer optimization problem from a solution of the real-valued optimization problem by adding fixed values of the integer variables.

9. The controller of claim 1, wherein the processor is further configured to update the optimized motion trajectory by solving the mixed-integer optimization problem warm-started based on the optimized motion trajectory.

10. The controller of claim 1, wherein the processor is further configured to update the optimized motion trajectory by solving the mixed-integer optimization problem warm-started based on the optimized motion trajectory in response to detection of time availability before an instant at which the optimized motion trajectory computation is to be completed.

11. The controller of claim 1, wherein the processor is further configured to:
  update the optimized motion trajectory by refining the mixed-integer optimization problem from a warm-start based on the optimized motion trajectory, wherein the optimized motion trajectory is updated within an available time period before an instant at which the optimized motion trajectory computation needs to be completed; and
  produce the optimized motion trajectory from the solution with a lowest cost computed within the available time period.

12. The controller of claim 1, wherein the processor is further configured to:
  detect infeasibility of the estimated motion trajectory as an infeasible estimated motion trajectory;
  update the parameters of the task by changing the state of the at least one device according to a portion of the infeasible estimated motion trajectory; and
  estimate the optimized motion trajectory for the updated parameters of the task.

13. The controller of claim 12, wherein the infeasibility of the estimated motion trajectory is detected by evaluating whether the estimated motion trajectory causes at least one collision between multiple devices including the at least one device or between a device of the at least one device and an obstacle.

14. The controller of claim 12, wherein the neural network is trained with training data including samples on a search space of the parameters of the task labeled with an optimal solution of the mixed-integer optimization problem, wherein the samples include a set of regular samples and a set of biased samples, and wherein the set of biased samples are biased towards the constraint.

15. The controller of claim 1, wherein the neural network is trained with a reconstruction loss function modified with a barrier function to increase a value of the reconstruction loss function based on a distance of the state of the at least one device to a region where the constraints on the motion of the at least one device is violated.

16. The controller of claim 15, wherein the barrier function has:
  a small value at a large distance from the region where the constraint is violated,
  a large value in the region where the constraint is violated, wherein the barrier function grows rapidly from the small value to the large value in a region at a small distance from the region where the constraint is violated, and
  wherein the barrier function is non-decreasing with respect to the distance to the region where the constraint is violated.

17. The controller of claim 1, wherein the neural network is a probabilistic neural network.

18. The controller of claim 1, wherein the processor is an embedded processing unit (EPU).

19. A method for controlling a motion of at least one device performing a task of changing a state of the at least one device subject to a constraint on the motion of the at least one device, wherein the method uses a processor coupled with stored instructions implementing the method, wherein the instructions, when executed by the processor carry out steps of the method, comprising:
  inputting parameters of the task including the state of the at least one device to a neural network trained to output an estimated motion trajectory for performing the task;
  extracting, from the estimated motion trajectory, at least some of integer values of a solution to a mixed-integer optimization problem for planning an execution of the task;
  solving the mixed-integer optimization problem for the parameters of the task with corresponding integer values fixed to the extracted integer values to produce an optimized motion trajectory subject to the constraint; and
  changing the state of the at least one device to track to the optimized motion trajectory.

20. A non-transitory computer-readable storage medium embodied thereon a program executable by a processor for performing a method for controlling a motion of at least one device performing a task changing a state of the at least one device subject to a constraint on the motion of the at least one device, the method comprising:
  inputting parameters of the task including the state of the at least one device to a neural network trained to output an estimated motion trajectory for performing the task;
  extracting, from the estimated motion trajectory, at least some of integer values of a solution to a mixed-integer optimization problem for planning an execution of the task;

solving the mixed-integer optimization problem for the parameters of the task with corresponding integer values fixed to the extracted integer values to produce an optimized motion trajectory subject to the constraint; and changing the state of the at least one device to track to the optimized motion trajectory.

* * * * *